(12) United States Patent
Nakarmi et al.

(10) Patent No.: US 12,063,512 B2
(45) Date of Patent: Aug. 13, 2024

(54) SYSTEMS AND METHODS FOR SECURING WIRELESS COMMUNICATION WITH DEVICE PINNING

(71) Applicant: TELEFONAKTIEBOLAGET LM ERICSSON (PUBL), Stockholm (SE)

(72) Inventors: Prajwol Kumar Nakarmi, Sollentuna (SE); Muhammad Ali Kazmi, Sundbyberg (SE); Loay Abdelrazek, Solna (SE); Jonathan Olsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/408,255

(22) Filed: Aug. 20, 2021

(65) Prior Publication Data
US 2023/0058517 A1 Feb. 23, 2023

(51) Int. Cl.
*H04W 12/73* (2021.01)
*H04W 12/122* (2021.01)
(Continued)

(52) U.S. Cl.
CPC ......... *H04W 12/122* (2021.01); *H04W 12/63* (2021.01); *H04W 12/73* (2021.01); *H04W 48/04* (2013.01)

(58) Field of Classification Search
CPC .... H04W 12/122; H04W 12/73; H04W 12/63
See application file for complete search history.

(56) References Cited

U.S. PATENT DOCUMENTS 9,474,096 B2 * 10/2016 Ayadurai ............... H04W 4/023
9,560,553 B2 * 1/2017 Dwyer .................. H04W 48/16
(Continued)

FOREIGN PATENT DOCUMENTS

EP 2744253 A1 6/2014

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2 (Release 8)", 3GPP TS 36.300 V8.5.0, May 2008.
(Continued)

*Primary Examiner* — Iral S Lakhia
(74) *Attorney, Agent, or Firm* — Sage Patent Group

(57) ABSTRACT

Systems and methods of the present disclosure are directed to a method performed by a Wireless Communication Device (WCD) for securing wireless communication. The method includes obtaining a configuration descriptive of network entity(s) comprising (a) Legitimate Network Entity (LNE(s)); (b) or Illegitimate Network Entity (INE(s)); or (c) both LNE(s) and INE(s). The method includes determining that a trigger condition for applying the configuration has occurred. The method includes, responsive to making the determination, applying the configuration to the WCD such that connection related procedure(s) of the WCD related to connection between the WCD and the network entity(s) are adjusted in such a manner that the WCD is permitted to connect to only the LNE(s), not permitted to connect to the INE(s), both permitted to connect to only the LNE(s) and not permitted to connect to the INE(s), or not permitted to connect to any network entity.

19 Claims, 19 Drawing Sheets

(51) Int. Cl.
*H04W 12/63* (2021.01)
*H04W 48/04* (2009.01)

(56) References Cited

U.S. PATENT DOCUMENTS

| | | | | |
|---|---|---|---|---|
| 10,616,934 | B2* | 4/2020 | Talebi Fard | H04W 48/00 |
| 10,956,899 | B2* | 3/2021 | Tanner | G06Q 20/401 |
| 11,218,881 | B1* | 1/2022 | De | H04W 12/63 |
| 11,303,727 | B2* | 4/2022 | Bansal | H04L 43/028 |
| 2007/0121937 | A1* | 5/2007 | Kochevar | G06Q 50/26 |
| | | | | 380/30 |
| 2013/0268357 | A1* | 10/2013 | Heath | G06Q 10/10 |
| | | | | 726/26 |
| 2015/0063570 | A1* | 3/2015 | Reddy | H04L 9/0891 |
| | | | | 380/270 |
| 2016/0143028 | A1* | 5/2016 | Mancuso | H04W 12/00 |
| | | | | 370/338 |
| 2016/0232349 | A1* | 8/2016 | Baeder | G06F 21/554 |
| 2017/0094520 | A1* | 3/2017 | Salyers | H04L 63/107 |
| 2018/0249384 | A1* | 8/2018 | Chami | H04W 36/0077 |
| 2019/0303919 | A1* | 10/2019 | Aabye | G06Q 20/36 |
| 2019/0306785 | A1* | 10/2019 | Hahn | H04W 48/12 |
| 2019/0333055 | A1* | 10/2019 | Mohammed | H04L 63/102 |
| 2020/0336914 | A1* | 10/2020 | Kaushik | H04W 64/003 |
| 2021/0168615 | A1* | 6/2021 | Guan | H04W 12/122 |
| 2021/0352484 | A1* | 11/2021 | Pandit | H04W 12/122 |
| 2022/0109536 | A1* | 4/2022 | Ghozlan | H04W 24/10 |
| 2022/0210656 | A1* | 6/2022 | Shaw | H04W 12/08 |

OTHER PUBLICATIONS

O-RAN, "O-RAN Architecture Description 3.0", O-RAN Alliance e.V., Nov. 2020.

* cited by examiner

UE STATES IN 5G

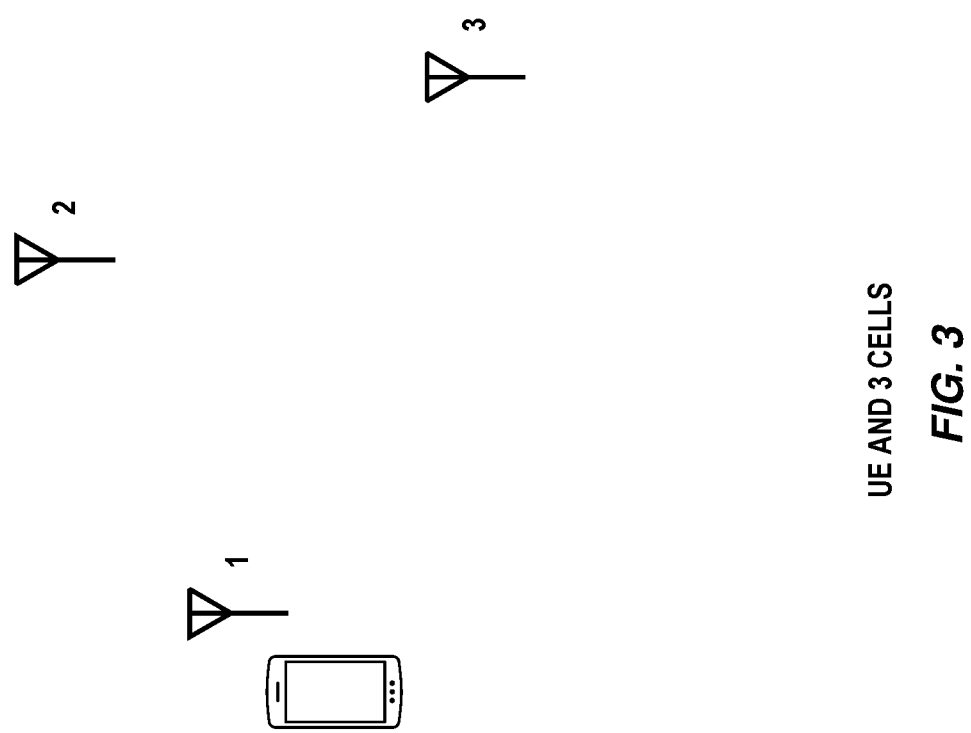

3 WCD AND 2 CELLS

3 WCD AND 1 CELL

MAKE A DETERMINATION THAT TRIGGER CONDITION FOR APPLYING THE CONFIGURATION HAS OCCURRED
1204

MAKING THE DETERMINATION THAT THE TRIGGER CONDITION FOR APPLYING THE CONFIGURATION HAS OCCURRED BASED AT LEAST IN PART ON ASSISTANCE INFORMATION
1204A

DETERMINING THAT A SIGNAL LEVEL RECEIVED AT THE WIRELESS COMMUNICATION DEVICE FROM A NETWORK CELL IS ABOVE A THRESHOLD VALUE
1204B

DETERMINING THAT THE MAGNITUDE OF A DIFFERENCE BETWEEN A FIRST SIGNAL LEVEL AND A SECOND SIGNAL LEVEL FROM A RESPECTIVE FIRST NETWORK CELL AND A RESPECTIVE SECOND NETWORK CELL IS BELOW A THRESHOLD VALUE
1204C

TRANSMITTING AN UPLINK SIGNAL TO A NETWORK CELL TO OBTAIN AN ESTIMATE OF THE TRANSMIT POWER OF THE NETWORK CELL
1204D

DETECTING A PRESENCE OF ONE OR MORE PERIODIC OR APERIODIC PATTERNS OF PRE-CONFIGURED PHYSICAL CELLS TRANSMITTED BY THE NETWORK CELL
1204E

RECEIVING MESSAGE INDICATIVE OF TRIGGER CONDITION OCCURRENCE
1204E

*FIG. 12B*

```
┌─────────────────────────────────────────────────────────────────────┐
│   RESPONSIVE TO MAKING THE DETERMINATION, APPLYING THE CONFIGURATION│
│                               1206                                  │
│                                                                     │
│   ┌───────────────────────────────────────────────────────────────┐ │
│   │   DISABLING CELL CHANGE FOR THE WCD FOR A PERIOD OF TIME      │ │
│   │                          1206A                                │ │
│   └───────────────────────────────────────────────────────────────┘ │
│                                                                     │
│   ┌───────────────────────────────────────────────────────────────┐ │
│   │            PINNING THE WCD TO A PINNED ENTITY                 │ │
│   │                          1206B                                │ │
│   └───────────────────────────────────────────────────────────────┘ │
│                                                                     │
│   ┌───────────────────────────────────────────────────────────────┐ │
│   │           PROHIBITING RRC RE-ESTABLISHMENT PROCEDURE          │ │
│   │                          1206C                                │ │
│   └───────────────────────────────────────────────────────────────┘ │
│                                                                     │
│   ┌───────────────────────────────────────────────────────────────┐ │
│   │  INITIATING NETWORK CELL RESELECTION PROCEDURE BASED ON       │ │
│   │  PRIORITIES ASSIGNED TO NETWORK CELLS BY THE CONFIGURATION    │ │
│   │                          1206D                                │ │
│   └───────────────────────────────────────────────────────────────┘ │
│                                                                     │
│   ┌───────────────────────────────────────────────────────────────┐ │
│   │         PROHIBITING NETWORK CELL RESELECTION PROCEDURE        │ │
│   │                          1206E                                │ │
│   └───────────────────────────────────────────────────────────────┘ │
│                                                                     │
│   ┌───────────────────────────────────────────────────────────────┐ │
│   │          PROHIBITING NETWORK CELL HANDOVER PROCEDURE          │ │
│   │                          1206F                                │ │
│   └───────────────────────────────────────────────────────────────┘ │
│                                                                     │
│   ┌───────────────────────────────────────────────────────────────┐ │
│   │        PROHIBITING INTER-FREQUENCY RESELECTION PROCEDURE      │ │
│   │                          1206G                                │ │
│   └───────────────────────────────────────────────────────────────┘ │
│                                                                     │
│   ┌───────────────────────────────────────────────────────────────┐ │
│   │        PROHIBITING INTRA-FREQUENCY RESELECTION PROCEDURE      │ │
│   │                          1206H                                │ │
│   └───────────────────────────────────────────────────────────────┘ │
└─────────────────────────────────────────────────────────────────────┘
```

*FIG. 12C*

SYSTEMS AND METHODS FOR SECURING WIRELESS COMMUNICATION WITH DEVICE PINNING

TECHNICAL FIELD

Generally, the present disclosure relates to securing wireless communication by adjusting connection related procedures between wireless communication devices and legitimate and/or illegitimate network entities.

BACKGROUND

Mobile Networks

Mobile networks provide wireless communication service worldwide. The architecture and protocols of mobile networks are standardized by Third Generation Partnership Project (3GPP). There are different generations of mobile network (e.g., 2G, 3G, 4G, 5G, etc.), the latest generation being the Fifth Generation (5G). On a high-level, there are generally three distinct parts in a mobile network: User Equipment (UE), Radio Access Network (RAN), and Core Network (CN). The UE is a mobile device used by users to wirelessly access the network. The RAN is responsible for providing wireless radio communication to the UE and connecting the UE to the CN. The CN is responsible for authenticating the UE, packet routing, and handling mobility of the UE, among other responsibilities.

In 5G, the RAN is known as Next Generation RAN (NG-RAN) and the CN is known as 5G Core (5GC). An NG-RAN is either a gNB providing New Radio (NR) user plane and control plane protocol terminations towards the UE, or a Next Generation Enhanced or Evolved Node B (ng-eNB) providing Evolved Universal Terrestrial Radio Access (E-UTRA) user plane and control plane protocol terminations towards the UE. A 5GC is composed of many functions or entities like Access and Mobility Management Function (AMF), Session Management Function (SMF), and User Plane Function (UPF).

FIG. 1 illustrates an example of the functional split between NG-RAN and 5GC as described in 3GPP TS 38.300. The NG-RAN (gNB or ng-eNB) host functions like radio resource management, radio bearer control, radio admission control, connection mobility control, and dynamic allocation of resources to UEs in both uplink and downlink (scheduling). Similarly, some functions hosted by the 5GC are illustrated in FIG. 1.

FIG. 2 illustrates various Radio Resource Control (RRC) states for a UE. In most wireless communication systems, a device can be in different states depending on the traffic activity. In NR, a UE can be in one of three RRC states, RRC_IDLE, RRC_ACTIVE and RRC_INACTIVE, as illustrated in FIG. 2.

In RRC_IDLE, there is no RRC context. This means that there are no radio resource parameters that are necessary for communication between the UE and the RAN, and at that state the UE doesn't belong to a specific cell. As such, no data transfer takes place in the RRC_IDLE state. In downlink, the UEs in this state periodically wake up to receive paging messages if any exist. Mobility is handled by the UE through cell reselection. In uplink, the only transmission activity that takes place is the random-access procedure.

In RRC_CONNECTED, the RRC context is established. The cell to which the UE communicates is known and radio level local identity of the UE which is referred to the Cell Radio Network Temporary Identifier (C-RNTI) is used for traffic identification between the UE and the network. This state is intended for data transfer to and from the UE. Mobility is managed by the RAN, where the UE provides neighboring cell measurements to the network which commands the UE to perform a handover when deemed relevant.

In RRC_INACTIVE, the RRC context is kept in both the UE and the RAN. Transition to connected state is fast since the context is preserved and the UE is seen connected from the core network perspective. The mobility is handled through cell selection. RRC_INACTIVE state can be seen as a mix of the idle and connected states.

SUMMARY

In some embodiments, a method is performed by a wireless communication device for securing wireless communication. The method includes obtaining a configuration descriptive of one or more network entities comprising: (a) one or more Legitimate Network Entities (LNEs); (b) or one or more Illegitimate Network Entities (INEs); or (c) both one or more LNEs and one or more INEs. The method includes making a determination that a trigger condition for applying the configuration has occurred. The method includes, responsive to making the determination, applying the configuration to the wireless communication device such that one or more connection related procedures of the wireless communication device related to connection between the wireless communication device and at least one of the one or more network entities are adjusted in such a manner that the wireless communication device is permitted to connect to only the one or more LNEs, not permitted to connect to the one or more INEs, both permitted to connect to only the one or more LNEs and not permitted to connect to the one or more INEs, or not permitted to connect to any network entity.

In some embodiments, the one or more network entities comprise one or more LNEs, and the one or more LNEs comprise one or more network cells.

In some embodiments, the configuration comprises implicit information for at least one of the one or more network entities, wherein the implicit information is descriptive of one or more of a bandwidth, a frequency range, a number of supported bands, or an antenna configuration.

In some embodiments, the configuration comprises explicit information for at least one of the one or more network entities, and wherein the explicit information is descriptive a connection priority level for each of the one or more network entities.

In some embodiments, the configuration comprises timing information configured such that:
  (a) the configuration cannot be applied before a reference timer has expired;
  (b) the configuration cannot be applied before a reference time instance has occurred;
  (c) the configuration cannot be applied after a validity timer has expired;
  (d) the configuration cannot be applied after a validity time instance has occurred;
  (e) after the configuration is applied, the configuration is removed from the wireless communication device after a timer has expired or a time instance has occurred; or
  (f) any combination of two or more of (a)-(e).

In some embodiments, the timing information is configured to initiate a timer or time instance responsive to making the determination.

In some embodiments, the configuration further comprises geographic information indicative of a geographic area. In some embodiments, the configuration is configured such that the wireless communication device must be within the geographic area for the configuration to be applied to the wireless communication device. In some embodiments, the geographic information comprises:
- (a) geographic coordinates for the geographic area;
- (b) a name for the area;
- (c) a list of network cell identifiers
- (d) a Tracking Area (TA);
- (e) a Mobile Country Code (MCC);
- (f) a Mobile Network Code (MNC); or
- (g) any combination of two or more of (a)-(f).

In some embodiments, the geographic information comprises a neighboring cell identifier for a neighboring cell, wherein the configuration is configured such that the wireless communication device must be within the geographic area for the configuration to be applied to the wireless communication device.

In some embodiments, the configuration is indicative of a period of time for which the configuration is to be applied to the wireless communication device.

In some embodiments, applying the configuration to the wireless communication device such that the one or more connection related procedures of the wireless communication device related to the connection between the wireless communication device and the at least one of the one or more network entities are adjusted comprises disabling a cell change for the wireless communication device for the period of time. In some embodiments, wherein disabling the cell change comprises:
- (a) disabling one or more of intra-frequency reselection or inter-frequency reselection for the wireless communication device for the period of time;
- (b) disabling cell handover for the wireless communication device for the period of time;
- (c) disabling Radio Resource Control (RRC) connection re-establishment for the wireless communication device for the period of time.
- (d) disabling RRC connection release with redirection for the wireless communication device for the period of time
- (e) disabling serving cell change in multi-carrier operation for the wireless communication device for the period of time; or
- (f) any combination of two or more of (a)-(e).

In some embodiments, applying the configuration to the wireless communication device such that the one or more connection related procedures of the wireless communication device are adjusted comprises pinning the wireless communication device to an entity such that the wireless communication device is prohibited from establishing a connection to a different entity.

In some embodiments, pinning the wireless communication device to the pinned entity comprises:
- (a) pinning the wireless communication device to a network cell using a Physical Cell Identifier (PCI) a Cell Global Identifier (CGI), or a Global Cable Identifier (GCI);
- (b) pinning the wireless communication device to a base station using a New Radio Base Station (gNB) identifier;
- (c) pinning the wireless communication device to a Public Land Mobile Network (PLMN) using a MCC and an MNC, or using a PLMN identifier;
- (d) pinning the wireless communication device to a TAC;
- (e) pinning the wireless communication device to an Access and Mobility Management Function (AMF) using an AMF region identifier or using an AMF set identifier;
- (f) pinning the wireless communication device to a private network using a Closed Access Group (CAG) identifier;
- (g) pinning the wireless communication device to a frequency; or
- (h) any combination of two or more of (a)-(g).

In some embodiments, the wireless communication device obtains the configuration via a network node, a core network node, information stored on a Subscriber Identification Module (SIM) card, or an application executed by the wireless communication device.

In some embodiments, the configuration further comprises assistance information. In some embodiments, making the determination that the trigger condition for applying the configuration has occurred comprises making the determination based at least in part on the assistance information. In some embodiments, the assistance information is descriptive of:
- (a) a largest signal level receivable by the wireless communication device from an LNE;
- (b) a smallest magnitude difference between signal levels receivable at the wireless communication device from any pair of legitimate network cells with different cell identifiers;
- (c) a smallest possible magnitude difference between signal levels receivable at the wireless communication device from any pair of network cells with identical cell identifiers;
- (d) a smallest possible magnitude of time difference between signals from two legitimate network cells with different cell identifiers receivable at the wireless communication device;
- (e) a smallest possible magnitude of time difference between signals from two legitimate network cells with identical cell identifiers receivable at the wireless communication device;
- (f) a smallest possible transmit power with which the wireless communication device sends uplink signals;
- (g) information descriptive of one or more patterns of certain physical signals that repeat periodically or non-periodically in legitimate network cells; or
- (h) any combination of two or more of (a)-(g).

In some embodiments, making the determination that the trigger condition has occurred comprises:
- (a) determining that a signal level received at the wireless communication device from a network cell is above a threshold value;
- (b) determining that the magnitude of a difference between a first signal level and a second signal level from a respective first network cell and a respective second network cell is below a threshold value;
- (c) transmitting an uplink signal to a network cell to obtain an estimate of the transmit power of the network cell;
- (d) detecting a presence of one or more periodic or aperiodic patterns of pre-configured physical cells transmitted by the network cell;
- (e) receiving a message indicative of the occurrence of the trigger condition; or
- (f) any combination of two or more of (a)-(e).

In some embodiments, applying the configuration to the wireless communication device such that the one or more connection related procedures of the wireless communication device are adjusted comprises:
(a) prohibiting RRC re-establishment procedure;
(b) initiating network cell reselection procedure based at least in part on priorities assigned to a plurality of network cells by the configuration;
(c) prohibiting network cell reselection procedure;
(d) prohibiting network cell handover procedure;
(e) prohibiting inter-frequency reselection procedure;
(f) prohibiting intra-frequency reselection procedure; or
(g) any combination of two or more of (a)-(f).

In some embodiments, the method further comprises providing, to the network node, data indicative of application of the configuration to the wireless communication device.

In some embodiments, obtaining the configuration further comprises providing, to the network node, data indicative of receipt of the configuration.

In some embodiments, the method further comprises, responsive to an occurrence of a second trigger condition, removing the configuration from the wireless communication device to remove the adjustment to the one or more connection related procedures of the wireless communication device.

In some embodiments, the second trigger condition comprises expiration of a timer for application of the configuration, occurrence of a time instance for expiration of the configuration, or obtainment of data indicative of instructions to remove the configuration.

In some embodiments, the wireless communication device connecting to a network entity comprises exchanging messages with the network entity, or adjusting cell selection behavior with the network entity.

In some embodiments, a wireless communication device for securing wireless communication is proposed. The wireless communication device is adapted to obtain a configuration descriptive of one or more network entities comprising: (a) one or more LNEs; (b) or one or more INEs; or (c) both one or more LNEs and one or more INEs. The wireless communication device is adapted to make a determination that a trigger condition for applying the configuration has occurred. The wireless communication device is adapted to, responsive to making the determination, apply the configuration to the wireless communication device such that one or more connection related procedures of the wireless communication device related to connection between the wireless communication device and at least one of the one or more network entities are adjusted in such a manner that the wireless communication device is:
(a) permitted to connect to only the one or more LNEs;
(b) not permitted to connect to the one or more INEs;
(c) both permitted to connection to only the one or more LNEs and not permitted to connect to the one or more INEs; or
(d) not permitted to connect to any network entity.

In some embodiments, a wireless communication device for securing wireless communication is proposed. The wireless communication device includes one or more transmitters and one or more receivers. The wireless communication device includes processing circuitry. The processing circuitry is configured to cause the wireless communication device to obtain a configuration descriptive of one or more network entities comprising: (a) one or more LNEs; (b) or one or more INEs; or (c) both one or more LNEs and one or more INEs. The processing circuitry is configured to cause the wireless communication device to make a determination that a trigger condition for applying the configuration has occurred. The processing circuitry is configured to cause the wireless communication device to, responsive to making the determination, apply the configuration to the wireless communication device such that one or more connection related procedures of the wireless communication device related to connection between the wireless communication device and at least one of the one or more network entities are adjusted in such a manner that the wireless communication device is:
(a) permitted to connect to only the one or more LNEs;
(b) not permitted to connect to the one or more INEs;
(c) both permitted to connection to only the one or more LNEs and not permitted to connect to the one or more INEs; or
(d) not permitted to connect to any network entity.

In some embodiments, a method is performed by a network node for securing wireless communication. The method includes providing, to a wireless communication device, a configuration descriptive of one or more network entities comprising:
(a) one or more LNEs;
(b) one or more INEs; or
(c) both one or more LNEs and one or more INEs.

The configuration is configured to, responsive to the wireless communication device making a determination that a trigger condition for applying the configuration has occurred, be applied by the wireless communication device such that one or more connection related procedures of the wireless communication device related to connection between the wireless communication device and at least one of the one or more network entities are adjusted in such a manner that the wireless communication device is:
(a) permitted to connect to only the one or more LNEs;
(b) not permitted to connect to the one or more INEs;
(c) both permitted to connection to only the one or more LNEs and not permitted to connect to the one or more INEs; or
(d) not permitted to connect to any network entity.

In some embodiments, one of the one or more LNEs comprises the network node.

In some embodiments, the one or more network entities comprise one or more LNEs, and wherein the one or more LNEs comprise one or more network cells.

In some embodiments, the one or more network entities comprise one or more INEs, and wherein the one or more INEs comprise one or more network cells In some embodiments, the configuration comprises implicit information for at least one of the one or more network entities, wherein the implicit information is descriptive of one or more of a bandwidth, a frequency range a number of supported bands, or an antenna configuration.

In some embodiments, the configuration comprises explicit information for at least one of the one or more network entities, and wherein the explicit is descriptive a connection priority level for each of the one or more network entities.

In some embodiments, the configuration comprises timing information configured such that:
(a) the configuration cannot be applied by the wireless communication device before a reference timer has expired;
(b) the configuration cannot be applied by the wireless communication device before a reference time instance has occurred;
(c) the configuration cannot be applied by the wireless communication device after a validity timer has expired;

(d) the configuration cannot be applied by the wireless communication device after a validity time instance has occurred;
(e) after the configuration is applied by the wireless communication device, the configuration is removed from the wireless communication device after a timer has expired or a time instance has occurred; or
(f) any combination of two or more of (a)-(e).

In some embodiments, the timing information is configured to initiate a timer or time instance when the wireless communication device makes the determination that the trigger condition for applying the configuration has occurred.

In some embodiments, the configuration further comprises geographic information indicative of a geographic area, wherein the configuration is configured such that the wireless communication device must be within the geographic area to apply the configuration to the wireless communication device, and wherein the geographic information comprises:
 (a) geographic coordinates for the geographic area;
 (b) a name for the area;
 (c) a TA;
 (d) a MCC;
 (e) a MNC; or
 (f) any combination of two or more of (a)-(e).

In some embodiments, the geographic information comprises neighboring cell identifiers for a neighboring cell, and wherein the configuration is configured such that the wireless communication device must be within the geographic area to apply the configuration to the wireless communication device.

In some embodiments, the configuration is indicative of a period of time for which the wireless communication device is permitted to apply the configuration.

In some embodiments, when applied by the wireless communication device, the configuration is configured to disable one or more of intra-frequency reselection or inter-frequency reselection for the wireless communication device for the period of time, or disable cell handover for the wireless communication device for the period of time.

In some embodiments, the configuration being applied by the wireless communication device such that the one or more connection related procedures of the wireless communication device related to the connection between the wireless communication device and the at least one of the one or more network entities are adjusted comprises the wireless communication device being pinned to an entity such that the wireless communication device is prohibited from establishing a connection to a different entity. In some embodiments, the wireless communication device being pinned to an entity comprises:
 (a) the wireless communication device being pinned to a network cell using a PCI, a CGI, or a GCI;
 (b) the wireless communication device being pinned to a base station using a gNB identifier;
 (c) the wireless communication device being pinned to a PLMN, using a MCC and an MNC, or using a PLMN identifier;
 (d) the wireless communication device being pinned a TAC;
 (e) the wireless communication device being pinned to an AMF, using an AMF region identifier or using an AMF set identifier;
 (f) the wireless communication device being pinned to a private network using a CAG identifier;
 (g) the wireless communication device being pinned to a frequency; or
 (h) any combination of two or more of (a)-(g).

In some embodiments, providing, to the wireless communication device, the configuration descriptive of the one or more network entities comprises generating the configuration and storing the configuration on a SIM card corresponding to the wireless communication device, or comprises providing the configuration descriptive of the one or more network entities to the wireless communication device via an application executed by the wireless communication device.

In some embodiments, the network node comprises a core network node.

In some embodiments, the network node comprises a gNB, an eNB, an AMF, or a SMF.

In some embodiments, the configuration further comprises assistance information. In some embodiments, the wireless communication device making the determination that the trigger condition for applying the configuration has occurred comprises the wireless communication device making the determination based at least in part on the assistance information. In some embodiments, the assistance information is descriptive of:
 (a) a largest signal level receivable by the wireless communication device from an LNE;
 (b) a smallest magnitude difference between signal levels receivable at the wireless communication device from any pair of legitimate network cells with different cell identifiers;
 (c) a smallest possible magnitude difference between signal levels receivable at the wireless communication device from any pair of network cells with identical cell identifiers;
 (d) a smallest possible magnitude of time difference between signals from two legitimate network cells with different cell identifiers receivable at the wireless communication device;
 (e) a smallest possible magnitude of time difference between signals from two legitimate network cells with identical cell identifiers receivable at the wireless communication device;
 (f) a smallest possible transmit power with which the wireless communication device sends uplink signals;
 (g) information descriptive of one or more patterns of certain physical signals that repeat periodically or non-periodically in legitimate network cells; or
 (h) any combination of two or more of (a)-(g).

In some embodiments, the wireless communication device making the determination that the trigger condition has occurred comprises:
 (a) the wireless communication device making a determination that a signal level received at the wireless communication device from a network cell is above a threshold value;
 (b) the wireless communication device making a determination that the magnitude of a difference between a first signal level and a second signal level from a respective first network cell and a respective second network cell is below a threshold value;
 (c) the wireless communication device transmitting an uplink signal to a network cell to obtain an estimate of the transmit power of the network cell;
 (d) the wireless communication device detecting a presence of one or more periodic or aperiodic patterns of pre-configured physical cells transmitted by the network cell; or
 (e) any combination of two or more of (a)-(d).

In some embodiments, the configuration being applied by the wireless communication device such that the one or more connection related procedures of the wireless communication device related to the connection between the wireless communication device and the at least one of the one or more network entities are adjusted comprises:
   (a) prohibiting RRC re-establishment procedure for the wireless communication device;
   (b) initiating network cell reselection procedure for the wireless communication device based at least in part on priorities assigned to a plurality of network cells by the configuration;
   (c) prohibiting network cell reselection procedure for the wireless communication device;
   (d) prohibiting network cell handover procedure for the wireless communication device;
   (e) prohibiting inter-frequency reselection procedure for the wireless communication device;
   (f) prohibiting intra-frequency reselection procedure for the wireless communication device; or
   (g) any combination of two or more of (a)-(f).

In some embodiments, the method further comprises receiving, from the wireless communication device, data indicative of receipt of the configuration.

In some embodiments, the method further comprises receiving, from the wireless communication device, data indicative of application of the configuration by the wireless communication device.

In some embodiments, the method further comprises providing, to the wireless communication device, data descriptive of instructions to remove the configuration from the wireless communication device to remove the adjustment to the one or more connection related procedures of the wireless communication device.

In some embodiments, a network node for securing wireless communication is proposed. The network node is adapted to provide, to a wireless communication device, a configuration descriptive of one or more network entities comprising:
   (a) one or more LNEs;
   (b) one or more INEs; or
   (c) both one or more LNEs and one or more INEs.

The configuration is configured to, responsive to the wireless communication device making a determination that a trigger condition for applying the configuration has occurred, be applied by the wireless communication device such that one or more connection related procedures of the wireless communication device related to connection between the wireless communication device and at least one of the one or more network entities are adjusted in such a manner that the wireless communication device is:
   (a) permitted to connect to only the one or more LNEs;
   (b) not permitted to connect to the one or more INEs;
   (c) both permitted to connection to only the one or more LNEs and not permitted to connect to the one or more INEs; or
   (d) not permitted to connect to any network entity.

In some embodiments, a network node for securing wireless communication is proposed. The network node includes one or more transmitters and one or more receivers. The network node includes processing circuitry. The processing circuitry is configured to cause the network node to provide, to a wireless communication device, a configuration descriptive of one or more network entities comprising:
   (a) one or more Legitimate Network Entities, LNEs;
   (b) one or more Illegitimate Network Entities, INEs; or
   (c) both one or more LNEs and one or more INEs.

The configuration is configured to, responsive to the wireless communication device making a determination that a trigger condition for applying the configuration has occurred, be applied by the wireless communication device such that one or more connection related procedures of the wireless communication device related to connection between the wireless communication device and at least one of the one or more network entities are adjusted in such a manner that the wireless communication device is:
   (a) permitted to connect to only the one or more LNEs;
   (b) not permitted to connect to the one or more INEs;
   (c) both permitted to connection to only the one or more LNEs and not permitted to connect to the one or more INEs; or
   (d) not permitted to connect to any network entity.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates an example of cell selection for a wireless communication device based on signal strength;

FIG. 12B is a data flow diagram for a method performed by a wireless communication device for making a determination that a trigger condition for applying a configuration has occurred according to some embodiments of the present disclosure FIG. 12C is a data flow diagram for a method performed by a wireless communication device for applying a configuration to the wireless communication device such that one or more connection related procedures of the wireless communication device are adjusted according to some embodiments of the present disclosure;

DETAILED DESCRIPTION

Figure 1:
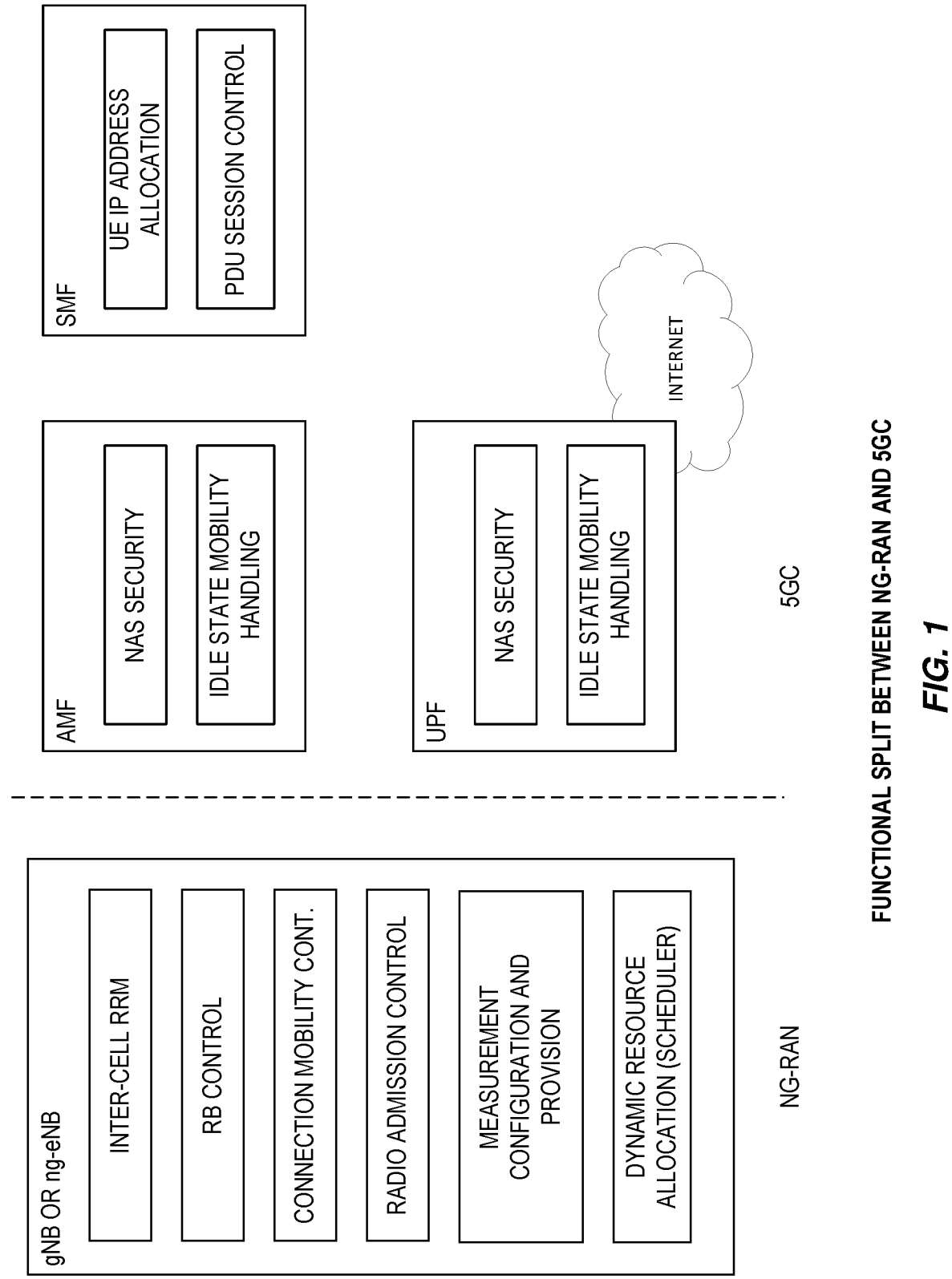
FIG. 1 illustrates an example of the functional split between Next-Generation Radio Access Network (NG-RAN) and 5G Core (5GC) as described in Third Generation Partnership Program (3GPP) Technical Specification (TS) 38.300.
Figure 2:
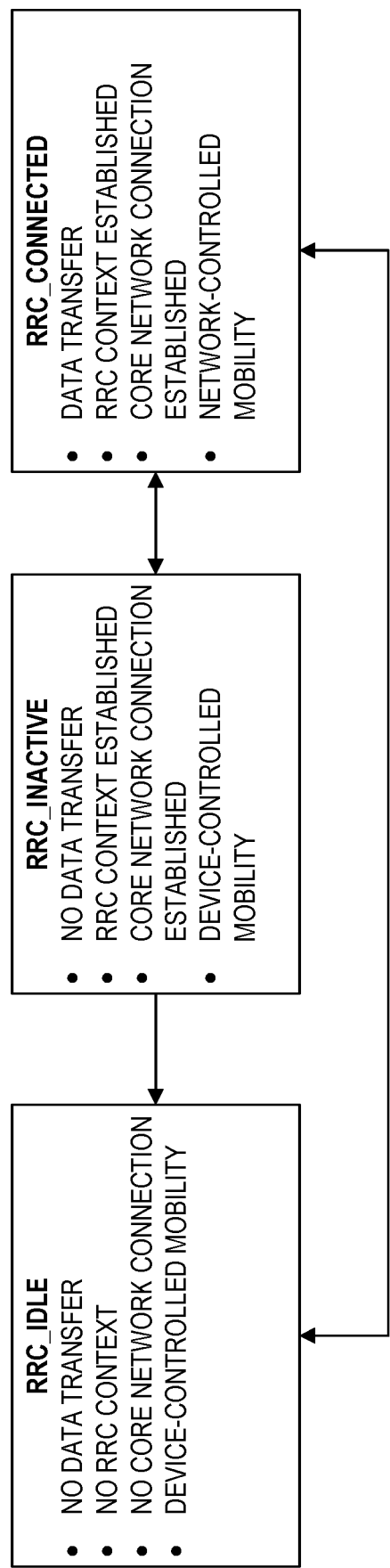
FIG. 2 illustrates various Radio Resource Control (RRC) states for a wireless communication device.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment (UE) device in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

UE Cell Selection in Network

Conventionally, when selecting a cell within a network, a UE selects the best cell (e.g., the cell with strongest signal level measured by the UE, etc.) as the serving cell when in a low activity state (e.g., RRC_IDLE, RRC_INACTIVE, etc.). In RRC_CONNECTED state, the cell change or handover is performed by the network based on UE reported signal measurements. Examples of signal measurements are signal strength and signal quality. Examples of signal strength are Reference Signal Received Power (RSRP), path loss etc. Examples of signal quality are Reference Signal Received Quality (RSRQ), Signal to Interference plus Noise Ratio (SINR), Signal to Noise Ratio (SNR) etc.

FIG. 3 illustrates an example of cell selection for a UE based on signal strength. Specifically, FIG. 3 illustrates a scenario with a UE and three cells numbered 1, 2, and 3, which are increasingly far away from the UE. Cell 1 is the nearest to UE, and cell 3 is the furthest from UE. Accordingly, signal strength of cell 1 is the strongest for the UE.

Based on the distances from the UE to the various cells, the following describes the relationship between distance and signal for the UE:

$$\text{Distance between } (UE \text{ and Cell } 1) < \text{Distance between } (UE \text{ and Cell } 2) < \text{Distance between } (UE \text{ and Cell } 3)$$

$$UE\text{'s received signal strength of Cell 1} > UE\text{'s received signal strength of Cell 2} > UE\text{'s received signal strength of Cell 2}$$

If the received signal strength of cell 2 and 3 of FIG. 3 are below acceptable threshold, the UE will naturally select cell 1, as it is the only acceptable cell option in the network. However, conventionally, the UE will still choses cell 1 even if the received signal strengths of cell 2 and cell 3 are well above acceptable threshold. This is because if the UE was to choose cell 2 or cell 3, then the communication between the UE and the selected cell would cause interference in cell 1's coverage. Further, communication between the UE and cells 2 or 3 would necessitate higher transmission power utilization to compensate the higher distance, leading to additional and/or worsening interference in cell 1's coverage area. These interferences could end up deteriorating quality of service for not only the illustrated UE but also for all other UEs in the Cell 1's coverage.

However, the inflexible decision to always select an "optimal" or "best" network cell by a wireless communication device can lead to security vulnerabilities. As an example, FIG. 4A illustrates an example of cell selection for a Legitimate Network Entity (LNE) for Wireless Communication Devices (WCDs) in a factory scenario. In a normal scenario, all machines (or robots) with cellular connectivity use the legitimate cell, be it camping in RRC_IDLE and RRC_INACTIVE state or sending/receiving messages in RRC_CONNECTED state. Specifically, WCDs 405A, 405B, and 405C are WCDs operating in a factory 402. As the legitimate cell 404 is the closest to the location of the factory, the WCDs 405A-C will select legitimate cell 404 as is optimal.

Conversely, in an attack scenario, an attacker uses a false base station and appear as a cell by broadcasting legitimate information (by first listening to legitimate cell and broadcasting the same information). The attacker's cell is made to transmit with power higher enough to make it sufficient for the machines to choose the attacker's cell. The attack herein may refer to any one of more of cyberattack, intrusion, faking of one or more network element (NE) of the network e.g., cell, Public Land Mobile Network (PLMN) etc. The term false NE (e.g., cell or PLMN) may refer to a NE, which does not belong to an operator providing service to the UE but illegally (e.g., without authorization or permission) uses identity of that operator. From this point onwards, the attacker can launch variety of attacks, e.g., denial of service on machines in RRC_IDLE and RRC_INACTIVE states because they will not receive any legitimate downlink messages like Paging; and extract subscription information (like International Mobile Subscriber Identity (IMSI)) in those machines.

In another scenario, there could be more than one cell in a factory. One of the cells could possess very good signal strength for hundreds of UEs. Those UEs would choose that cell due to the strong signal strength. At a particular time, that cell could be overloaded because all the UEs suddenly have to upload/download large amount of data, or some malicious app triggers simultaneous activity on all the UEs. Even though the malicious app may not have access to the UEs' baseband, it can trigger upload/download of data so that the baseband tries to connect to the network. Other cells which do not have as good signal strength may be underloaded, but the UEs still chose the cell with better signal strength, keeping that cell overloaded.

Figure 4B:
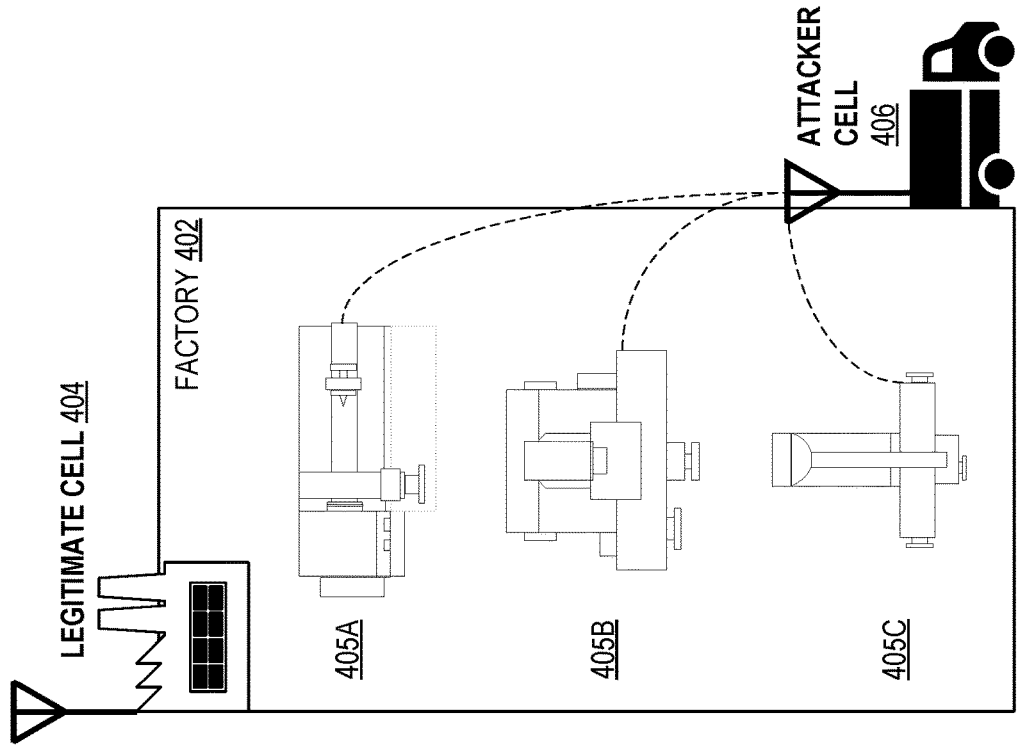
FIG. 4B illustrates an example of cell selection between a LNE and an Illegitimate Network Entity (INE) for wireless communication devices in a factory scenario.
Figure 4A:
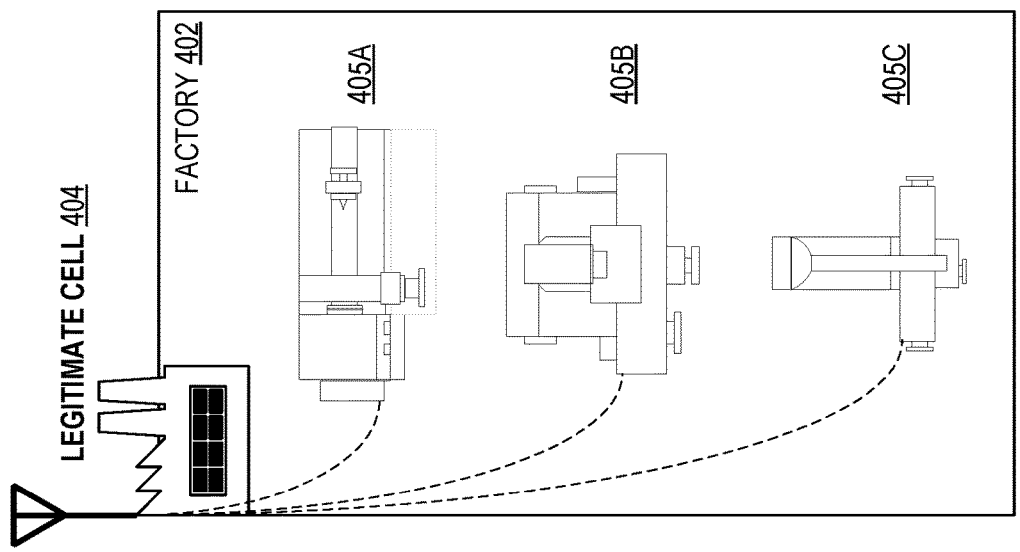
FIG. 4A illustrates an example of cell selection for a Legitimate Network Entity (LNE) for wireless communication devices in a factory scenario.

As an example, FIG. 4B illustrates an example of cell selection between a LNE and an Illegitimate Network Entity (INE) for WCDs in a factory scenario. Here, an attacker cell 406 (e.g., an INE) has been placed closer to the WCDs 405A-C than the legitimate cell 404. As the attacker cell 406 is closer than the legitimate cell 404, and thus provides a stronger signal, the WCDs 405A-C will instead select the attacking cell 406 rather than the legitimate cell 404. Thus, the selection of cells by WCDs based purely on signal strength can create security vulnerabilities within the network.

The present disclosure proposes a mechanism that will allow the network to "pin" WCDs to certain parts of the network (e.g., to a certain network cell, etc.). More specially, a WCD obtains a configuration (e.g., descriptive of legitimate network entity(s) (LNEs), illegitimate network entity(s) (INEs), etc.) based on pre-defined information or by receiving it from the network. This configuration is sometimes referred to herein as a "pinning configuration". The WCD determines a trigger (e.g., intrusion, cyberattack etc., from false base station) and, in response to the trigger, the WCD uses the obtained pinning configuration to adapt one or more procedures (e.g., stop cell reselection, or select only one of the particular cells etc.).

Specifically, on a high level, the WCD can acquire, or otherwise obtain, a pinning configuration from a network node (e.g., RAN, Core Network (CN), gNB, AMF, etc.) via signaling. Alternatively, the WCD can obtain the pinning configuration via pre-configured information (e.g., configured or otherwise stored on a Subscriber Identity Module (SIM) card, etc.).

Upon determining the occurrence, a trigger condition (e.g., detecting a false cell, etc.), the WCD applies one or more actions related to the pinning configuration. In some embodiments, the WCD only applies the action(s) after taking into consideration other information (e.g., information regarding a cyberattack, intrusion, detection of false base station, etc.). In some embodiments, the WCD may determine a trigger condition by default (e.g., superseding legacy procedures) through various configurations. Alternatively, in some embodiments, the WCD may determine the occurrence of a trigger condition or apply the action(s) after obtaining some message from the network.

In some embodiments, the WCD removes the action(s) if the pinning configuration is fulfilled (e.g., a threat is no longer active, a validity time for application of the pinning configuration has expired, etc.). Additionally, in some embodiments, the WCD informs the network node if the UE has or is applying the pinning configuration.

Systems and methods of the present disclosure provide a number of technical effects and benefits. As one example technical effect and benefit, the ability to pin a wireless communication device to a network entity with a pinning configuration increases the networks ability to provide services. For example, the network is able to protect wireless communication devices from being lured away by attacking cells, therefore substantially reducing security risks for network users. For another example, if the network is under heavy load, or targeted attack, the network can utilize the pinning configurations to distribute wireless communication devices among different parts of the network so that a single part (e.g., a single network cell) is not overloaded. In such fashion, the network can load balance in attacking and non-attacking scenarios, therefore substantially increasing efficiency of the network and reducing utilization of network resources (e.g., power consumption, processing cycles, hardware utilization, etc.).

Figure 5:
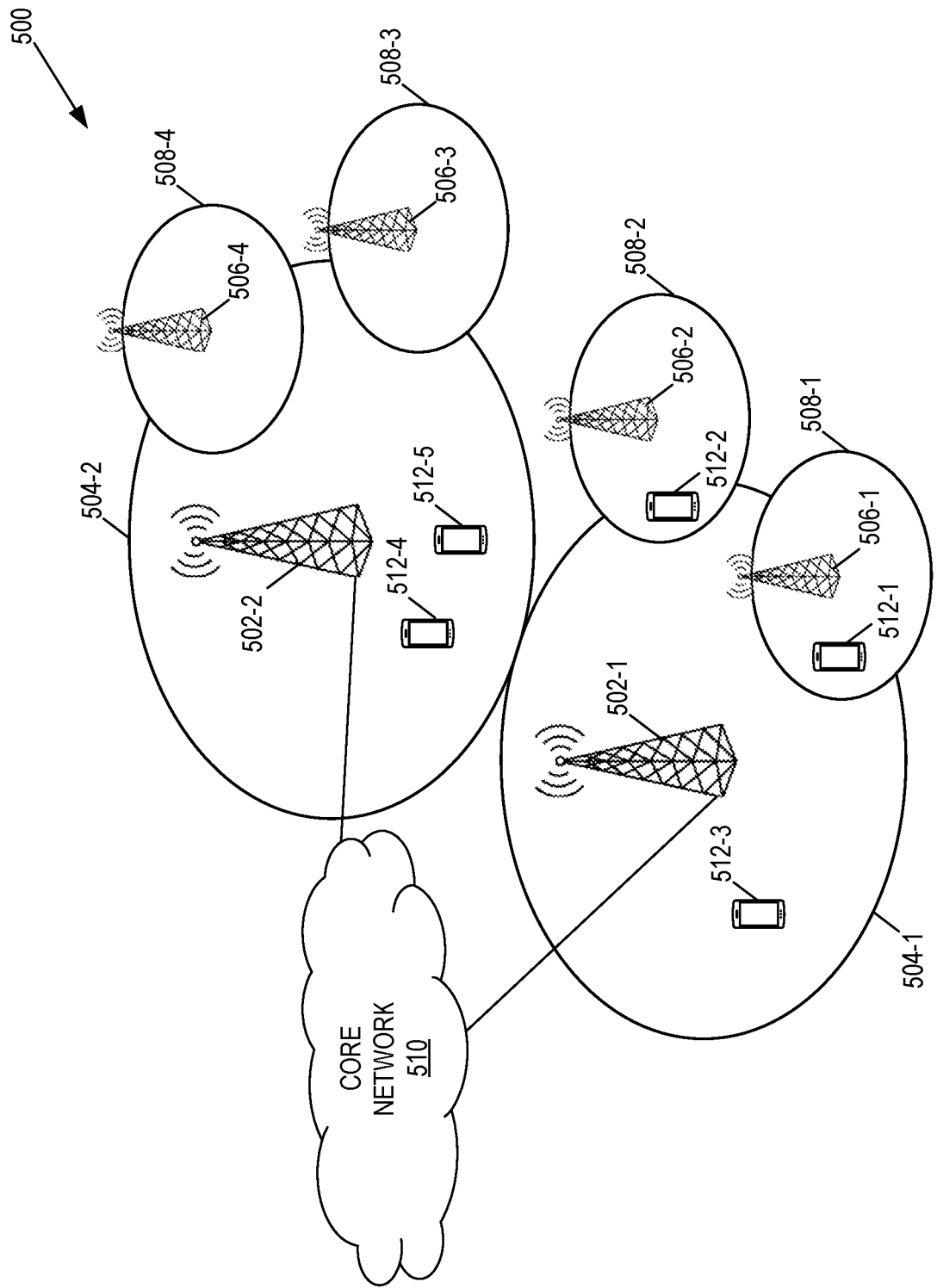
FIG. 5 illustrates one example of a cellular communications system according to some embodiments of the present disclosure.

FIG. 5 illustrates one example of a cellular communications system 500 in which embodiments of the present disclosure may be implemented. In the embodiments described herein, the cellular communications system 500 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 502-1 and 502-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small base stations (such as pico or femto base stations) or Remote radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network 510, which in the 5G System (5GS) is referred to as the 5GC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs, but the present disclosure is not limited thereto.

Figure 6:
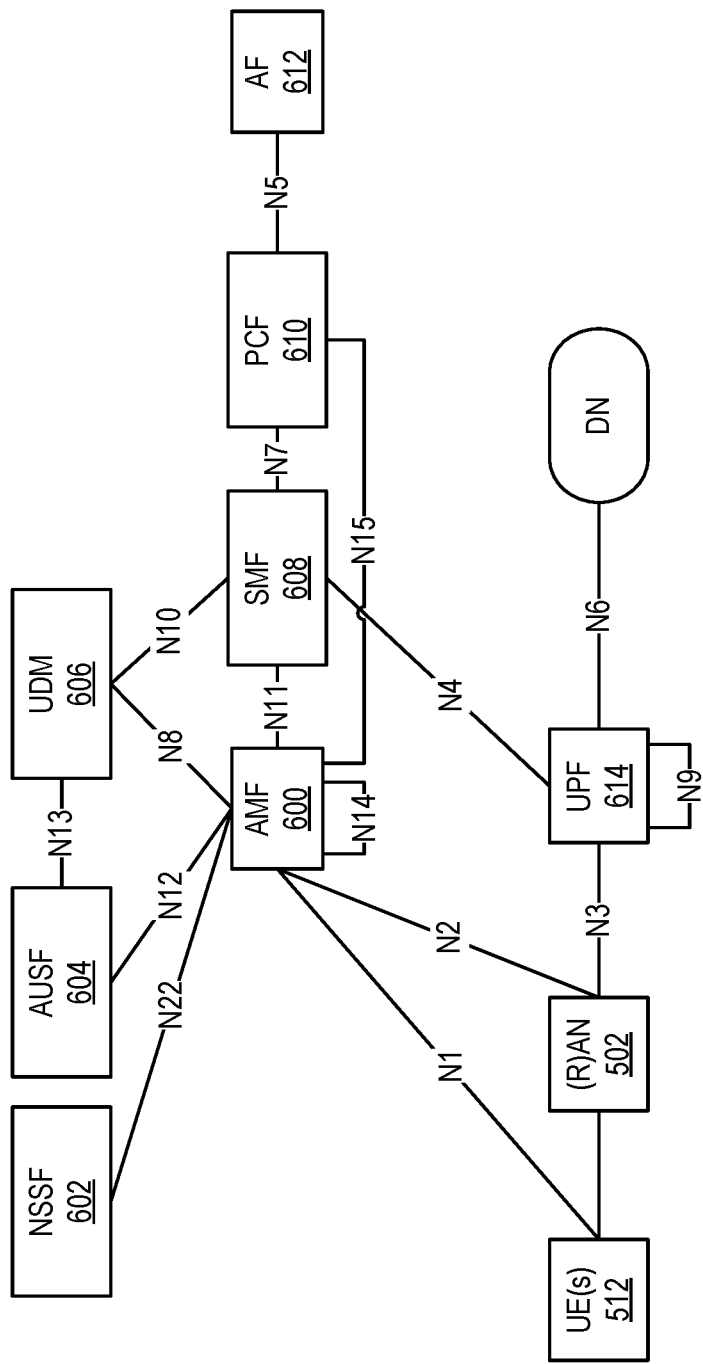
FIGS. 6 and 7 illustrate example embodiments in which the cellular communication system of FIG. 5 is a 5G System (5GS)

FIG. 6 illustrates a wireless communication system represented as a 5G network architecture composed of core Network Functions (NFs), where interaction between any two NFs is represented by a point-to-point reference point/interface. FIG. 6 can be viewed as one particular implementation of the system 500 of FIG. 5.

Seen from the access side the 5G network architecture shown in FIG. 6 comprises a plurality of UEs 512 connected to either a RAN 502 or an Access Network (AN) as well as an AMF 600. Typically, the R(AN) 502 comprises base stations, e.g. such as eNBs or gNBs or similar. Seen from the core network side, the 5GC NFs shown in FIG. 6 include a NSSF 602, an AUSF 604, a UDM 606, the AMF 600, a SMF 608, a PCF 610, and an Application Function (AF) 612.

Reference point representations of the 5G network architecture are used to develop detailed call flows in the normative standardization. The N1 reference point is defined to carry signaling between the UE 512 and AMF 600. The reference points for connecting between the AN 502 and AMF 600 and between the AN 502 and UPF 614 are defined as N2 and N3, respectively. There is a reference point, N11, between the AMF 600 and SMF 608, which implies that the SMF 608 is at least partly controlled by the AMF 600. N4 is used by the SMF 608 and UPF 614 so that the UPF 614 can be set using the control signal generated by the SMF 608, and the UPF 614 can report its state to the SMF 608. N9 is the reference point for the connection between different UPFs 614, and N14 is the reference point connecting between different AMFs 600, respectively. N15 and N7 are defined since the PCF 610 applies policy to the AMF 600 and SMF 608, respectively. N12 is required for the AMF 600 to perform authentication of the UE 512. N8 and N10 are defined because the subscription data of the UE 512 is required for the AMF 600 and SMF 608.

The 5GC network aims at separating User Plane (UP) and Control Plane (CP). The UP carries user traffic while the CP carries signaling in the network. In FIG. 6, the UPF 614 is in the UP and all other NFs, i.e., the AMF 600, SMF 608, PCF 610, AF 612, NSSF 602, AUSF 604, and UDM 606, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 600 and SMF 608 are independent functions in the CP. Separated AMF 600 and SMF 608 allow independent evolution and scaling. Other CP functions like the PCF 610 and AUSF 604 can be separated as shown in FIG. 6. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 7:
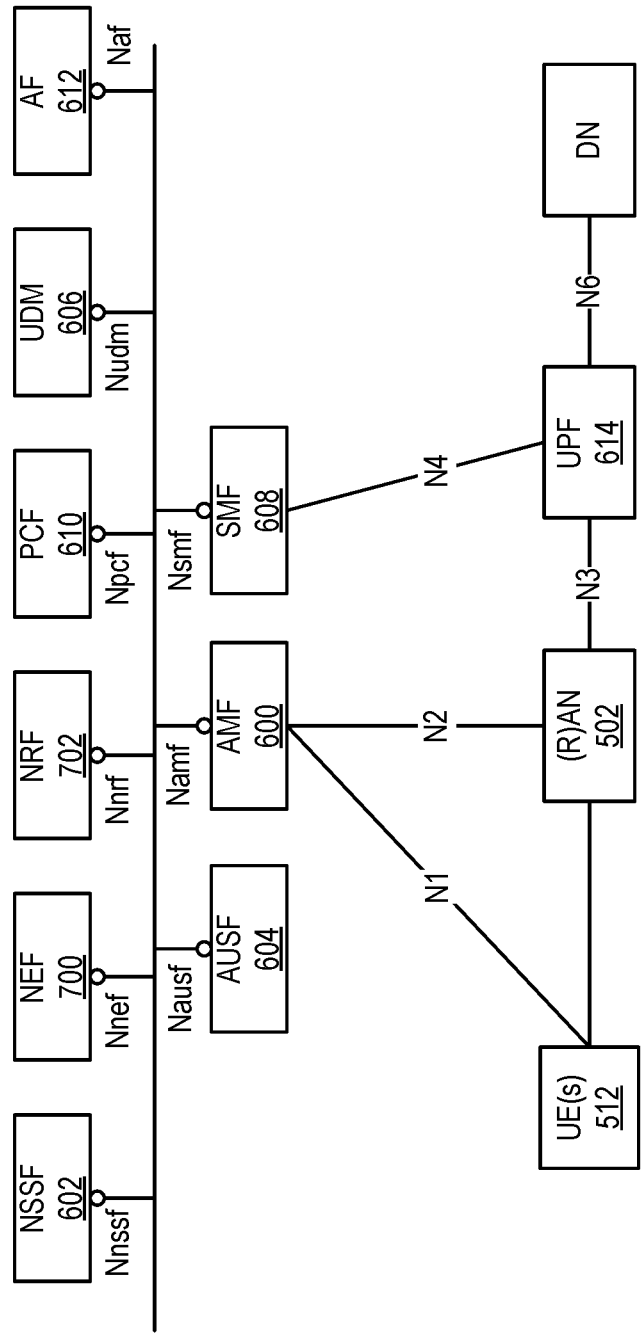

FIG. 7 illustrates a 5G network architecture using service-based interfaces between the NFs in the CP, instead of the point-to-point reference points/interfaces used in the 5G network architecture of FIG. 6. However, the NFs described above with reference to FIG. 6 correspond to the NFs shown in FIG. 7. The service(s) etc. that a NF provides to other authorized NFs can be exposed to the authorized NFs through the service-based interface. In FIG. 7 the service based interfaces are indicated by the letter "N" followed by the name of the NF, e.g. Namf for the service based interface of the AMF 600 and Nsmf for the service based interface of the SMF 608, etc. The NEF 700 and the NRF 702 in FIG. 7 are not shown in FIG. 6 discussed above. However, it should be clarified that all NFs depicted in FIG. 6 can interact with the NEF 700 and the NRF 702 of FIG. 7 as necessary, though not explicitly indicated in FIG. 6.

Some properties of the NFs shown in FIGS. 6 and 7 may be described in the following manner. The AMF 600 provides UE-based authentication, authorization, mobility management, etc. A UE 512 even using multiple access technologies is basically connected to a single AMF 600 because the AMF 600 is independent of the access technologies. The SMF 608 is responsible for session management and allocates Internet Protocol (IP) addresses to UEs. It also selects and controls the UPF 614 for data transfer. If a UE 512 has multiple sessions, different SMFs 608 may be allocated to each session to manage them individually and possibly provide different functionalities per session. The AF 612 provides information on the packet flow to the PCF 610 responsible for policy control in order to support Quality of Service (QoS). Based on the information, the PCF 610 determines policies about mobility and session management to make the AMF 600 and SMF 608 operate properly. The AUSF 604 supports authentication function for UEs or similar and thus stores data for authentication of UEs or similar while the UDM 606 stores subscription data of the UE 512. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 8:
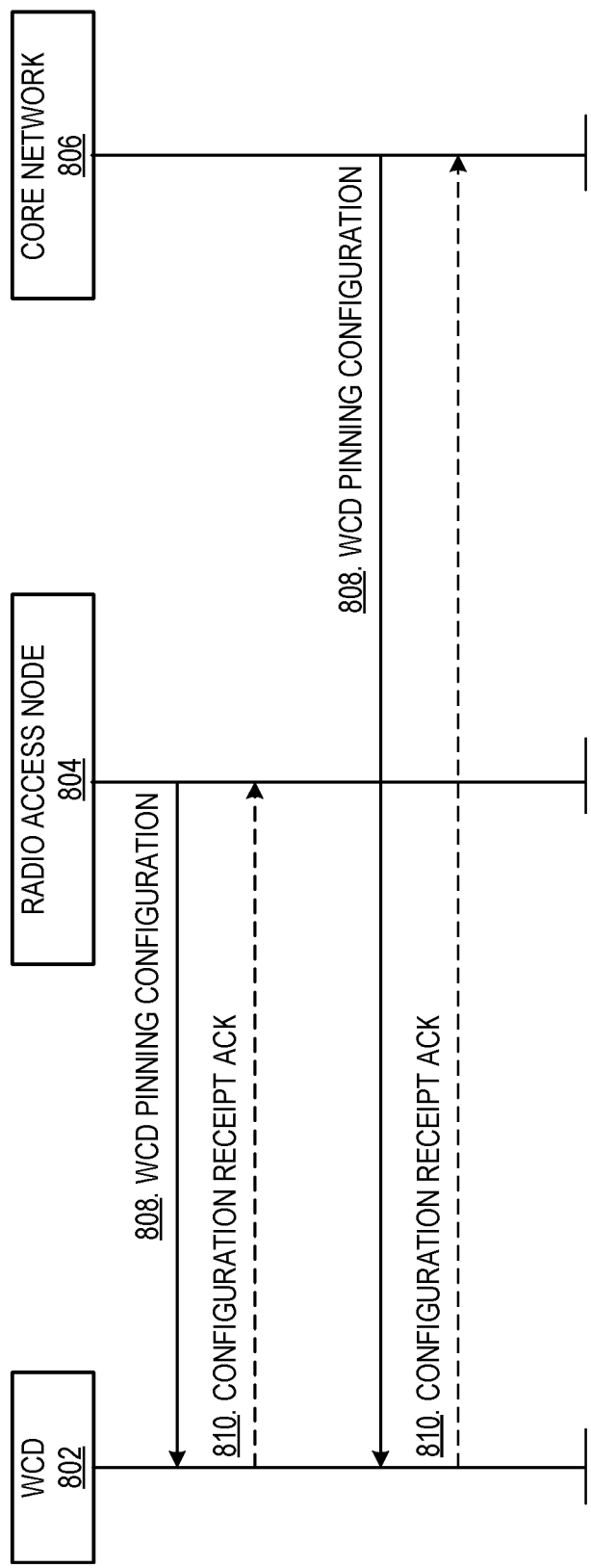
FIG. 8 is a data flow diagram for provision of a configuration from entity(s) of a network and a wireless communication device.

FIG. 8 is a data flow diagram for provision of a pinning configuration from entity(s) of a network and a WCD. Specifically, in some embodiments, a radio access node 804 can provide a WCD pinning configuration 808 to the WCD 802. In some embodiments, in response, the WCD can provide a pinning configuration receipt acknowledgement 810 to the radio access node. Similarly, in some embodiments, the core network 806 can provide the UE pinning configuration 808. The WCD 802 can provide the pinning configuration receipt acknowledgement 810 to the core network 806.

As such, the part of the network that provides the WCD pinning configuration 808 to the WCD 802 could be the RAN 804 (a network node e.g., radio node such as base station, eNB, gNB, access point etc.) or the CN 806 (a core network node such as MME, AMF, SMF etc.), as depicted in FIG. 8. The messages from RAN 804 to WCD 802 could be RRC messages, and the messages from CN 806 to WCD 802 could be NAS messages. The WCD 802 could also optionally send Acknowledge messages 810 to the network. For example, the WCD 802 can be configured with the pinning configuration 808 when it is in RRC connected state (e.g., via dedicated message/channel), in a secure way (e.g., which is ciphered/has integrity protection). In some embodiments, the WCD 802 can obtain the WCD pinning configuration 808 from the RAN 804 or the CN 806 through an application executed on the WCD 802.

It should be noted that in some embodiments, rather than obtaining the WCD pinning configuration 808 from a RAN 804 or a CN 806, the WCD 802 can obtain the WCD pinning configuration 808 from pre-configured information. For example, the WCD 802 can obtain the pinning configuration 808 from information stored on a SIM card.

Figure 9:
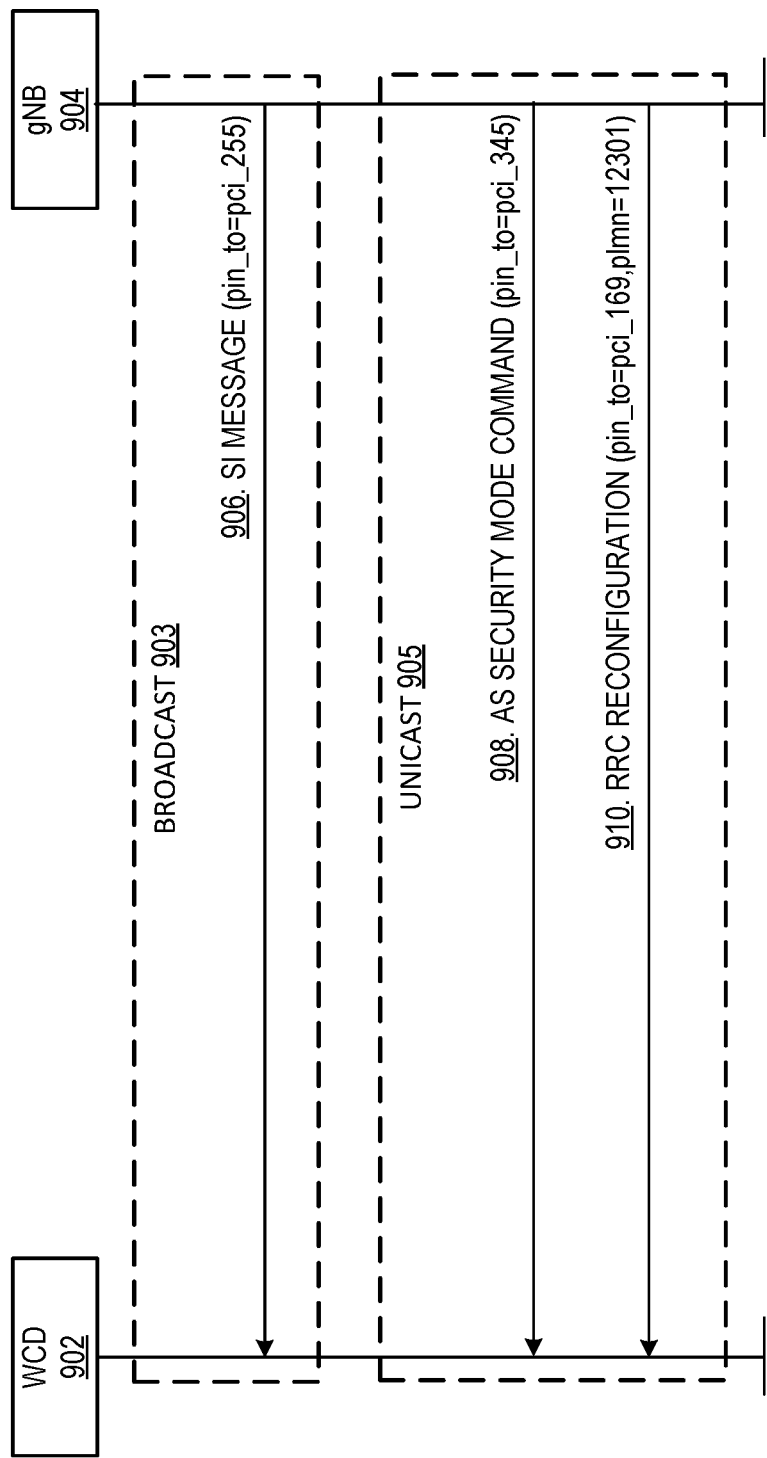
FIG. 9 is a data flow diagram for provision of a configuration (e.g., a pinning configuration) from a New Radio Base Station (gNB) to a wireless communication device.

FIG. 9 is a data flow diagram for provision of a pinning configuration from a gNB 904 to a WCD 902. Specifically, in some embodiments, the gNB 904 may utilize a broadcast transmission 903 to transmit a SI message 906 including a pinning configuration indicative of an instruction of (pin_to=pci_255) for the WCD 902. Additionally, or alternatively, the gNB 904 may utilize a unicast transmission 905 to the WCD 902 to transmit an AS Security Mode Command (pin_to=pci_345) 908 and a RRC reconfiguration message indicative of instructions of (pin_to=pci_16, plmn_12301) 910 to provide the pinning configuration to the WCD 902.

Figure 10:
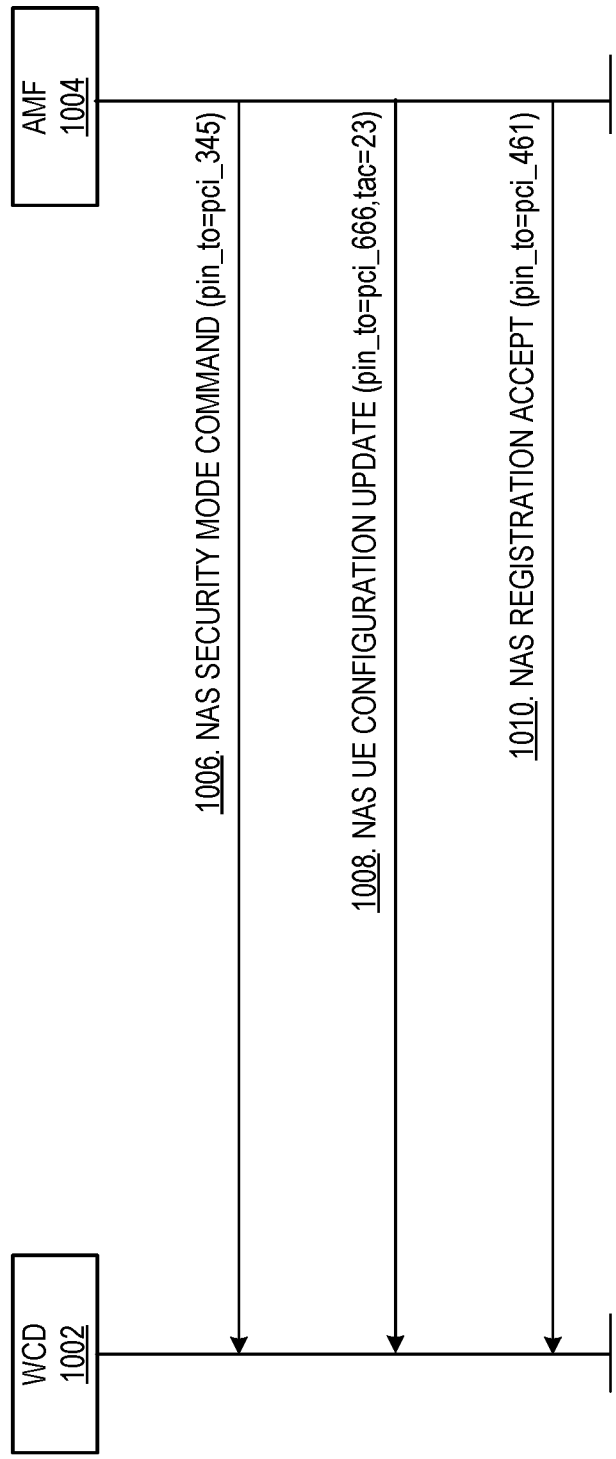
FIG. 10 is a data flow diagram for provision of a configuration (e.g., a pinning configuration) from an Access and Mobility Management Function (AMF) to a wireless communication device.

FIG. 10 is a data flow diagram for provision of a pinning configuration from an AMF 1004 to a WCD 1002. Specifically, the AMF 1004 can transmit a Non-Access Stratum (NAS) Security Mode Command (pin_to=pci_345) 1006 to the WCD 1002. The AMF 1004 can then transmit a NAS WCD Configuration Update message (pin_to=pci_666, tac=23) 1008 and a NAS Registration Accept message (pin_to=pci_461) 1010 to the WCD 1002 to provide the pinning configuration to the WCD 1002.

Figure 11:
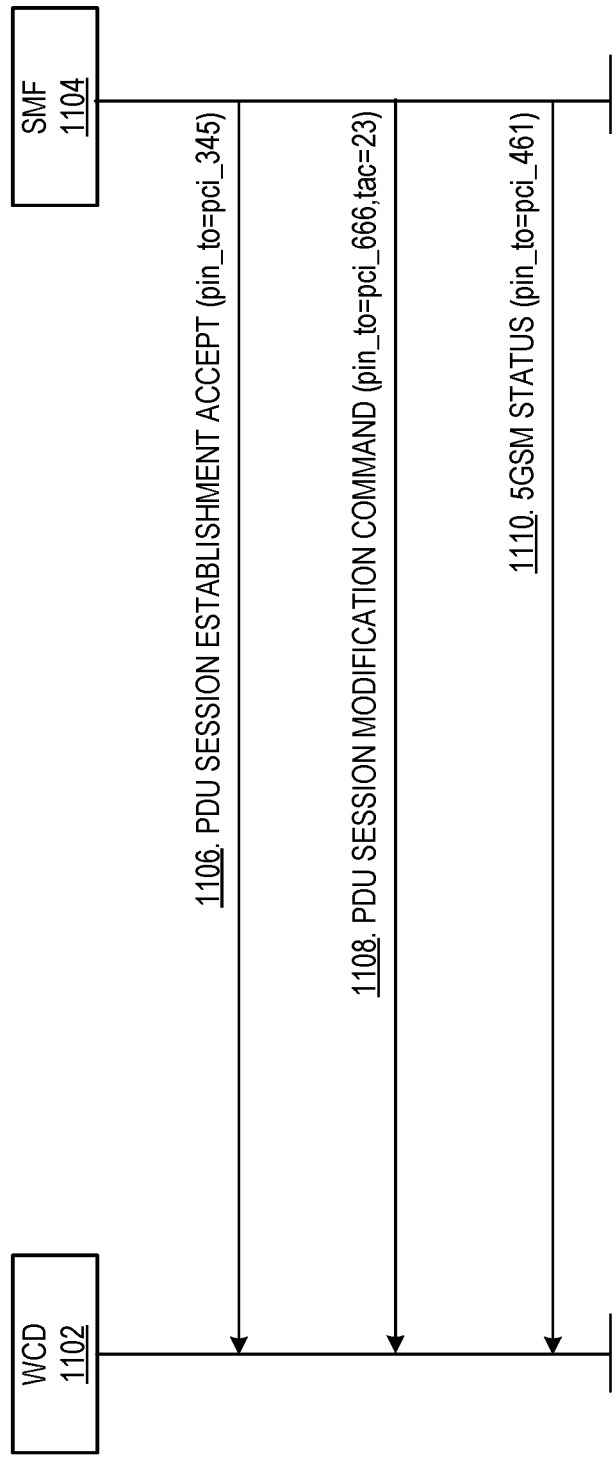
FIG. 11 is a data flow diagram provision of a configuration (e.g., a pinning configuration) from a Session Management Function (SMF) to a wireless communication device.

FIG. 11 is a data flow diagram provision of a pinning configuration from a SMF 1104 to a WCD 1102. Specifically, to provide a pinning configuration to the WCD 1102, the SMF 1104 first provides a PDU session establishment accept (pin_to=pci_345) 1106. Next the SMF 1104 provides a PDU session modification command (pin_to=pci_666, tac=23) 1108 and a 5GSM status message (pin_to=pci_461) 1110.

Figure 12A:
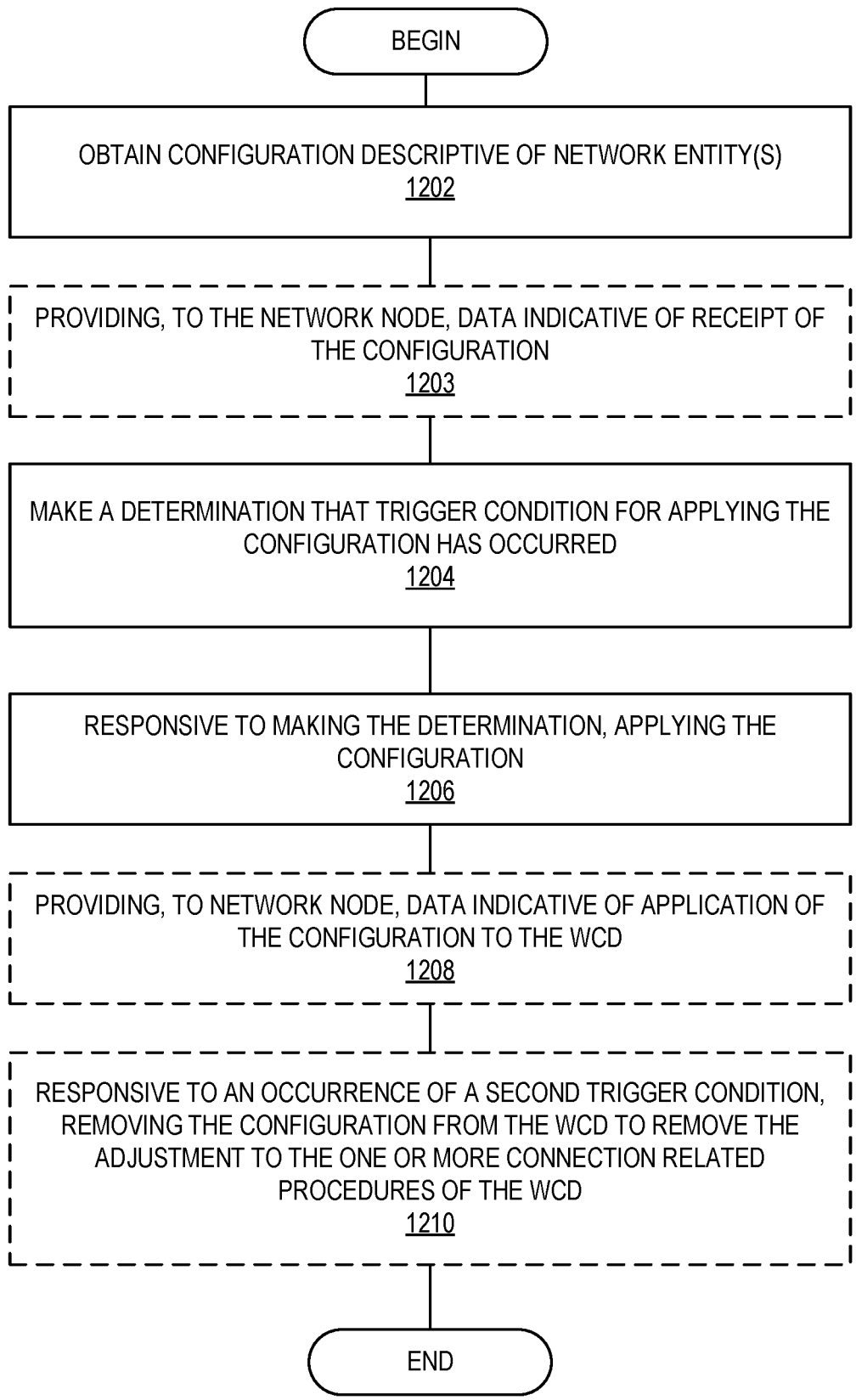
FIG. 12A is a data flow diagram for a method performed by a wireless communication device for securing wireless communication using a configuration according to some embodiments of the present disclosure.

FIG. 12A is a data flow diagram for a method performed by a WCD for securing wireless communication using a pinning configuration according to some embodiments of the present disclosure.

At step 1202, a WCD first obtains a pinning configuration descriptive of one or more network entities. The one or more network entities include one or more Legitimate Network Entities (LNEs), one or more Illegitimate Network Entities (INEs), or both one or more LNEs and one or more INEs. In some embodiments, a network entity can be logical or physical entity. The network entity may represent one node or a group of nodes forming a network. Examples of network entities can include base stations, CN nodes, Public Land Mobile Networks (PLMNs), etc. For example, the one or more LNEs may include one or more respective network cells, and/or the one or more INEs may include one or more respective network cells. Typically, the information related to LNEs or INEs may include one or more identifiers related to corresponding network entity. For example, the pinning configuration may include information for an LNE may describe Physical Cell Identifier (PCI) and/or Cell Global Identifier (CGI) of a cell which the WCD is allowed to connect/camp on.

It should be noted that the term legitimate network entity used herein is utilized to refer to any network entity which is allowed or permitted to serve the WCD e.g., to which the WCD can connect, with which WCD can receive/transmit signaling messages/data etc. The term illegitimate network entity used herein is utilized to refer to any network entity which is forbidden, NOT allowed or NOT permitted to serve the WCD e.g., to which WCD should not connect, WCD should not receive/transmit signaling messages/data etc.

As such, in some embodiments, the pinning configuration may be or otherwise include a Legitimate Pinning Configuration (LPC) or Illegitimate Pinning Configuration (IPC) or Hybrid Pinning Configuration (HPC). In case of HPC, some of the information may be related to LNE while some of the information may be related to INE e.g., CGI-1 of cell1 which is LNE and CGI-2 of cell2 which is INE.

Additionally, in some embodiments, the pinning configuration may further include information about at least one of the one or more network entities (e.g., one or more cell configurations for legitimate network cells, etc.). The information can be implicit information or explicit information. For example, the implicit information may describe a bandwidth (BW), a number of supported bands, a frequency range, an antenna configuration etc. used in different cells, etc. The explicit information may describe a connection priority level for each of the one or more network entities. In some embodiments, the priority level can be expressed in terms of an absolute value or statistical value. For example cell1, cell2, cell3, ..., celln in the pinning configuration can be associated with absolute priority levels 1, 2, 3, ..., n respectively, where 1 is highest priority and n is lowest priority. In another example, cell1, cell2, cell3, ..., celln in the pinning configuration can be associated with probability of p1, p2, p3, ..., pn respectively, where p1+p2+p3+, ... pn=1 and p1>p2p3, ... pn. This may be used by the WCD for prioritizing cells to which it shall connect with higher probability. For example, the WCD could reselect a cell with highest possible configuration e.g., cell with largest number of bands, largest BW, or largest number of antennas etc. In another example, the WCD could reselect a cell with highest priority level (absolute or statistical).

In some embodiments, the pinning configuration can include timing information that is configured such that:
(a) the configuration cannot be applied before a reference timer has expired;
(b) the configuration cannot be applied before a reference time instance has occurred;
(c) the configuration cannot be applied after a validity timer has expired;
(d) the configuration cannot be applied after a validity time instance has occurred;
(e) after the configuration is applied, the configuration is removed from the WCD after a timer has expired or a time instance has occurred; or
(f) any combination of two or more of (a)-(e).

For example, the timing information may start a reference time instance after which the WCD can apply the pinning configuration e.g., reference System Frame Number (SFN) or Hyper SFN, Coordinated Universal time (UTC) time, etc. Additionally, or alternatively, the timing information may include or otherwise indicate validity time e.g., duration over which the pinning configuration is applicable. It can be expressed in time units e.g., slots, frames, duration in X time units, etc. Additionally, or alternatively, in some embodiments, the timing information may include or otherwise indicate an end-time reference time instance after which WCD shall not apply the pinning configuration e.g., reference SFN or Hyper SFN, UTC time etc. In some embodiments, the timing configuration. As such, in some embodiments, the pinning configuration is indicative of a period of time for which the configuration is to be applied to the WCD.

In some embodiments, the pinning configuration further includes geographic information indicative of a geographic area. The pinning configuration is configured such that the WCD must be within the geographic area for the pinning configuration to be applied to the WCD. In some embodiments, the geographic information includes:
(a) geographic coordinates for the geographic area;
(b) a name for the area;
(c) a list of network cell identifiers;
(d) a Tracking Area (TA);
(e) a Mobile Country Code (MCC);
(f) a Mobile Network Code (MNC); or
(g) any combination of two or more of (a)-(e).

Additionally, or alternatively, in some embodiments, geographic information includes a neighboring cell identifiers for a neighboring cell.

At step 1203, in some embodiments, the WCD can provide data indicative of receipt of the pinning configuration to the network node. For example, the WCD may utilize signaling as described with regards to FIG. 9 to acknowledge receipt of the pinning configuration to the network node.

At step 1204, the WCD makes a determination that a trigger condition for applying the pinning configuration has occurred. This determination will be discussed in greater detail with regards to FIG. 12B. In some embodiments, responsive to making the determination that the trigger condition has occurred, the WCD transmits data indicative of the occurrence to the network node.

At step 1206, the WCD, responsive to making the determination, applies the pinning configuration to the WCD such that one or more connection related procedures of the WCD are adjusted.

For example, upon determining the trigger (e.g., explicit indication from the network, certain conditions like radio conditions being met, being served by false cell, detected strong false cell etc.), the WCD may apply one or more parameters in the pinning configuration to adapt one or more procedures. For example, when under attack, the WCD may reselect to one of the cells indicated in the pinning configuration, or keep camping/selecting the original cell. For example, the WCD may disable the cell change procedure for certain time period or until the attack has ended e.g., stop cell reselection, avoid RRC re-establishment etc. For another example, when under attack, the WCD may reselect to one of the PLMN indicated in the pinning configuration. For another example, when under attack, the WCD may reselect to one of the cells according to the listed priority level indicated in the pinning configuration provided that the cell also meets the cell reselection criteria such as have acceptable signal level e.g., signal level of that cell is above certain threshold.

The connection related procedures of the WCD may include intra and/or inter-frequency reselection, cell handover, RRC reestablishment, reselecting to a different cell based on priority, etc. The connection related procedures of the WCD are related to connection between the WCD and at least one of the one or more network entities, and are adjusted in such a manner that the WCD is:
(a) permitted to connect to only the one or more LNEs;
(b) not permitted to connect to the one or more INEs;
(c) both permitted to connect to only the one or more LNEs and not permitted to connect to the one or more INEs; or
(d) not permitted to connect to any network entity.

In some embodiments, the WCD connecting to a network entity includes exchanging messages (e.g., RRC messages, etc.) or transitioning into an RRC_CONNECTED state, or includes not exchanging messages, but instead adjusting behavior (e.g., adjusting cell selection behavior, cell reselection behavior to determine where to camp (e.g., in RRC_IDLE or RRC_INACTIVE state), etc.). Application of the pinning configuration to the WCD will be discussed in greater detail with regards to FIG. 12C.

At step 1208, in some embodiments, the wireless provides, to the network node, data indicative of application of the pinning configuration to the WCD. For example, if the WCD detects the trigger, or that it is under attack, then the WCD may further inform this to the network node. For example, the WCD may establish a dedicated connection with the serving cell and convey information about the attack to the legitimate cell. The information may comprise one or more of false cell configuration (e.g., PCI, CGI, Bandwidth (BW) etc.), received signal level from false cell(s), time of the attack, duration over which the attack lasted, any unusual message received from the false cell etc. The network may use received information for performing one or more tasks e.g., adapting pinning configuration for that WCD, sending pinning configuration to other WCDs, etc.

At step 1210, in some embodiments, the WCD, responsive to an occurrence of a second trigger condition, removes the pinning configuration from the WCD to remove the adjustment to the one or more connection related procedures of the WCD. In some embodiments, the second trigger condition includes expiration of a timer for application of the pinning configuration, occurrence of a time instance for expiration of the pinning configuration, or obtainment of data indicative of instructions to remove the pinning configuration.

FIG. 12B is a data flow diagram for a method performed by a WCD for making a determination that a trigger condition for applying a pinning configuration has occurred according to some embodiments of the present disclosure. Specifically, as described previously at step 1204 of FIG. 12A, the WCD can obtain information about trigger to apply pinning configuration (for example a possible attack e.g., from a false base station, false cell) implicitly or explicitly.

At step 1204A, in some embodiments, to make the determination that the trigger condition for applying the pinning configuration has occurred, the WCD makes the determination that the trigger condition for applying the pinning configuration has occurred based at least in part on assistance information.

For example, in some embodiments, the pinning configuration (e.g., the pinning configuration obtained at step 1202 of FIG. 12A includes assistance information for enabling the WCD to determine the occurrence of the trigger condition (e.g., detecting an attack has occurred, etc.). The assistance information can describe:

(a) A largest signal level receivable by the WCD from an LNE. For example, the assistance information may describe a largest signal level (e.g., RSRP) which the WCD can receive/measure from any legitimate/allowed base station of the serving operating e.g., H dBm.

(b) A smallest magnitude difference between signal levels receivable at the WCD from any pair of legitimate network cells with different cell identifiers. For example, the assistance information may describe a smallest possible magnitude difference between signal levels ($\Delta G1$ dB) (e.g., $|RSRP_x-RSRP_y|$) which can be received at the WCD from any pair of legitimate cells (e.g., cell_X and cell_Y) with different cell IDs e.g., with PCI1 and PCI2.

(c) A smallest possible magnitude difference between signal levels receivable at the WCD from any pair of network cells with identical cell identifiers. For example, the assistance information may describe a smallest possible magnitude difference between signal levels ($\Delta G2$ dB) (e.g., $|RSRP_x-RSRP_y|$) which can be received at the WCD from any pair of cells (e.g., cell_X and cell_Y) with same cell IDs e.g., indicating how often PCI is reused geographically.

(d) A smallest possible magnitude of time difference between signals from two legitimate network cells with different cell identifiers receivable at the WCD. For example, the assistance information may describe a smallest possible magnitude of receive time difference of signals ($\Delta T1$) (e.g., $|Tx_x-T_y|$) which can be experienced at the WCD from any two legitimate cells (e.g., cell_X and cell_Y) with different cell IDs.

(e) A smallest possible magnitude of time difference between signals from two legitimate network cells with identical cell identifiers receivable at the WCD. For example, the assistance information may describe a smallest possible magnitude of receive time difference of signals ($\Delta T2$) (e.g., $|Tx_x-T_y|$) which can be experienced at the WCD from any two legitimate cells (e.g., cellx and celly) with the same cell IDs e.g., indicating also how often PCI is reused geographically.

(f) A smallest possible transmit power with which the WCD sends uplink signals. For example, the assistance information may describe a smallest possible WCD transmit power (e.g., K dBm) with which the WCD can send uplink signals e.g., random access to a legitimate cell.

(g) Information descriptive of one or more patterns of certain physical signals that repeat periodically or non-periodically in legitimate network cells. For example, the assistance information may describe information about one or more patterns of certain physical signals (e.g., reference signals), which may repeat periodically or non-periodically, in a legitimate cell. For example, this may be set of unique patterns of tracking signals (e.g., CSI-RS). Additionally, or alternatively, in some embodiments the information may include for example time-frequency resources (e.g., resource elements, RBs etc.), timing information (e.g., symbols/slots/frame/SFN etc. where they occur, periodicity) etc.

(h) Or any combination of two or more of (a)-(g).

At step 1204B, in some embodiments, to make the determination that the trigger condition for applying the pinning configuration has occurred, the WCD determines that a signal received at the WCD from a network cell is above a threshold value. For example, if the received signal level (e.g., RSRP) is above threshold (H) from a cell (e.g., Cell A) then the WCD may assume that cell (e.g., cell A) is a false cell. The false cell may have stolen the identity or other information (e.g., system information) of one of the legitimate cells (e.g., old, or current serving cell or any cell in the pinning configuration). The false cell may transmit at very high power (e.g., TX power above threshold e.g., 49 dBm) to increase the chances of serving more UEs. This may lead to unusually high receive signal at the WCD.

At step 1204C, in some embodiments, to make the determination that the trigger condition for applying the pinning configuration has occurred, the WCD determines that the magnitude of a difference between a first signal level and a second signal level from a respective first network cell and a respective second network cell is below a threshold value.

For example, if the WCD determines that the magnitude of the difference between signal levels of any two cells is below threshold (e.g., $\Delta G1$) then the WCD may assume that one of the cells is false. It is not expected that the same operator will deploy cells so close to each other leading to so small, received signal strength difference at the WCD. For another example, if the WCD determines that the magnitude of the receive difference of signal of any two cells is below threshold (e.g., $\Delta T1$) then the WCD may assume that one of the cells is false. It is not expected that the same operator will deploy cells so close to each other leading to so small receive time difference of signals at the WCD.

At step 1204D, in some embodiments, to make the determination that the trigger condition for applying the pinning configuration has occurred, the WCD transmits an uplink signal to a network cell to obtain an estimate of the transmit power of the network cell. For example, if the WCD suspects that a certain network cell is false or illegitimate, then the WCD may further estimate its transmit power ($P_{TX}$) based on open loop power control principle for transmitting an uplink signal to that potential false cell e.g., random access. In open loop power control mechanism, the WCD estimates its TX power based on the target SNR at the cell and path loss (PL) between the network cell and the WCD. The PL is determined as PL (dB)=RS TX power (dBm)–RSRP (dBm). If $P_{TX}$ is below threshold (K dBm) then the WCD may assume that the cell is false. This is because the regular/legitimate operator is not expected to deploy base station which is too close to any WCD location e.g., for both performance, health, and regulatory considerations.

At step 1204E, in some embodiments, to make the determination that the trigger condition for applying the pinning configuration has occurred, the WCD detects a presence of one or more periodic or aperiodic patterns of pre-configured physical cells transmitted by the network cell. For example, the WCD detects the presence of one or more periodic or aperiodic patterns of pre-configured physical signals (e.g., reference signal) transmitting by the cell. If the WCD cannot detect the pattern of such signal in a cell over certain time period, then it may assume that cell as illegitimate. The reason is that the false base station/network/intruder may manage to steal signaling related information e.g., SI and reproduce/retransmit in a false cell. But transmission of unique pattern of physical signals, especially which changes over time, requires considerable effort and may need specific lower layer configuration and even hardware updates.

At step 1204F, in some embodiments, to make the determination that the trigger condition for applying the pinning configuration has occurred, the WCD receives a message indicative of the occurrence of the trigger condition. For example, the WCD may receive a message from a network node indicating that the WCD is under attack or is expected to be under attack. If this message is sent to the WCD via system information, then the WCD may establish connection and acquire information from the cell via dedicated channel/connection to ascertain the authenticity of the message. If the dedicated connection is established, then the WCD can be informed via secure connection. If the WCD fails to establish the dedicated connection, then the WCD may assume that it is under attack. If the legitimate network is unable to convey message to the WCD via SI because WCD may be connected to a false cell (e.g., removed by false cell) then it may page the WCD with higher power so that the WCD can receive paging also from neighboring cell(s).

For another example, the WCD (WCD1) may receive a message from another WCD (WCD2) provided that the WCD1 is capable of device to device communication e.g., capable of direct communication, direct discovery, proximity service, V2X etc. For example, WCD2 may be informed by its serving cell (e.g., assuming legitimate cell) to inform WCD1 that WCD1 is under attack.

For yet another example, the WCD may receive a message from the network node in RRC or Non-Access Stratum (NAS) message indicative of the occurrence of the trigger condition.

In some embodiments, the WCD may autonomously determine that it is under attack (e.g., served by or otherwise detects a false network cell, etc.). Specifically, if the WCD detects an unusual pinning configuration or signal levels from the cell then it may assume that cell is false. For example, the WCD may store typical configuration parameters (e.g., antenna configuration, BW, bandwidth part, SSB configuration, received signal levels etc.) from the last N number of legitimate serving cells and/or from the last K number of legitimate serving cells over the last TO time period. The parameters N, K and TO can be pre-defined or configured by the network node. If one or more stored configuration parameters do not match with corresponding parameters in a serving cell, then the WCD may assume that serving cell is false.

FIG. 12C is a data flow diagram for a method performed by a WCD for applying a pinning configuration to the WCD such that one or more connection related procedures of the WCD are adjusted according to some embodiments of the present disclosure. Specifically, as described previously at step 1206 of FIG. 12A, the WCD can, responsive to making the determination at step 1204, apply the pinning configuration to the WCD such that one or more connection related procedures of the WCD related to connection between the WCD and at least one of the one or more network entities are adjusted in such a manner that the WCD is:
  (a) permitted to connect to only the one or more LNEs;
  (b) not permitted to connect to the one or more INEs;
  (c) both permitted to connect to only the one or more LNEs and not permitted to connect to the one or more INEs; or
  (d) not permitted to connect to any network entity.

At step 1206A, in some embodiments, to apply the pinning configuration to the WCD such that one or more connection related procedures of the WCD are adjusted, the WCD disables a cell change for the WCD for a period of time (e.g., a period of time specified in the timing information, a period of time indicated by the pinning configuration for which the pinning configuration is to be applied to the WCD, etc.). Disabling the cell change includes:
  (a) disabling one or more of intra-frequency reselection or inter-frequency reselection for the WCD for the period of time;
  (b) disabling cell handover for the WCD for the period of time;
  (c) disabling RRC connection re-establishment for the WCD for the period of time.
  (d) disabling RRC connection release with redirection for the WCD for the period of time
  (e) disabling serving cell change in multi-carrier operation (e.g., Scell change in Carrier Aggregation (CA), Pscell change in dual connectivity, etc.) for the WCD for the period of time; or
  (f) any combination of two or more of (a)-(e).

At step 1206B, in some embodiments, to apply the pinning configuration to the WCD such that one or more connection related procedures of the WCD are adjusted, the WCD pins the WCD to a pinned entity. Pinning the WCD to a pinned entity includes:
  (a) pinning the WCD to a network cell using a Physical Cell Identifier (PCI) a Cell Global Identifier (CGI) or a Global Cable Identifier (GCI);
  (b) pinning the WCD to a base station using a gNB identifier
  (c) pinning the WCD to a PLMN, using a Mobile Country Code (MCC) and a Mobile Network Code (MNC), or using a PLMN identifier;
  (d) pinning the WCD to a Tracking Area Code (TAC);
  (e) pinning the WCD to an Access and Mobility Management Function (AMF) using an AMF region identifier or using an AMF set identifier;
  (f) pinning the WCD to a private network using a Closed Access Group (CAG) identifier;
  (g) pinning the WCD to a frequency; or
  (h) any combination of two or more of (a)-(g).

At step 1206C, in some embodiments, to apply the pinning configuration to the WCD such that one or more connection related procedures of the WCD are adjusted, the WCD prohibits RRC re-establishment procedure (e.g., for a period of time, until instructed to resume, etc.).

At step 1206D, in some embodiments, to apply the pinning configuration to the WCD such that one or more connection related procedures of the WCD are adjusted, the WCD initiates network cell reselection procedure based at least in part on priorities assigned to a plurality of network cells by the pinning configuration.

At step 1206E, in some embodiments, to apply the pinning configuration to the WCD such that one or more connection related procedures of the WCD are adjusted, the WCD prohibits network cell reselection procedure (e.g., for a period of time, until instructed to resume, etc.).

At step 1206F, in some embodiments, to apply the pinning configuration to the WCD such that one or more connection related procedures of the WCD are adjusted, the WCD prohibits network cell handover procedure (e.g., for a period of time, until instructed to resume, etc.).

At step 1206G, in some embodiments, to apply the pinning configuration to the WCD such that one or more connection related procedures of the WCD are adjusted, the WCD prohibits inter-frequency reselection procedure (e.g., for a period of time, until instructed to resume, etc.).

At step 1206H, in some embodiments, to apply the pinning configuration to the WCD such that one or more connection related procedures of the WCD are adjusted, the WCD prohibits intra-frequency reselection procedure (e.g., for a period of time, until instructed to resume, etc.).

It should be noted that, in some embodiments, to apply the pinning configuration to the WCD such that one or more connection related procedures of the WCD are adjusted, the WCD may perform two or more of any of steps 1206A-1206H.

Figure 13:
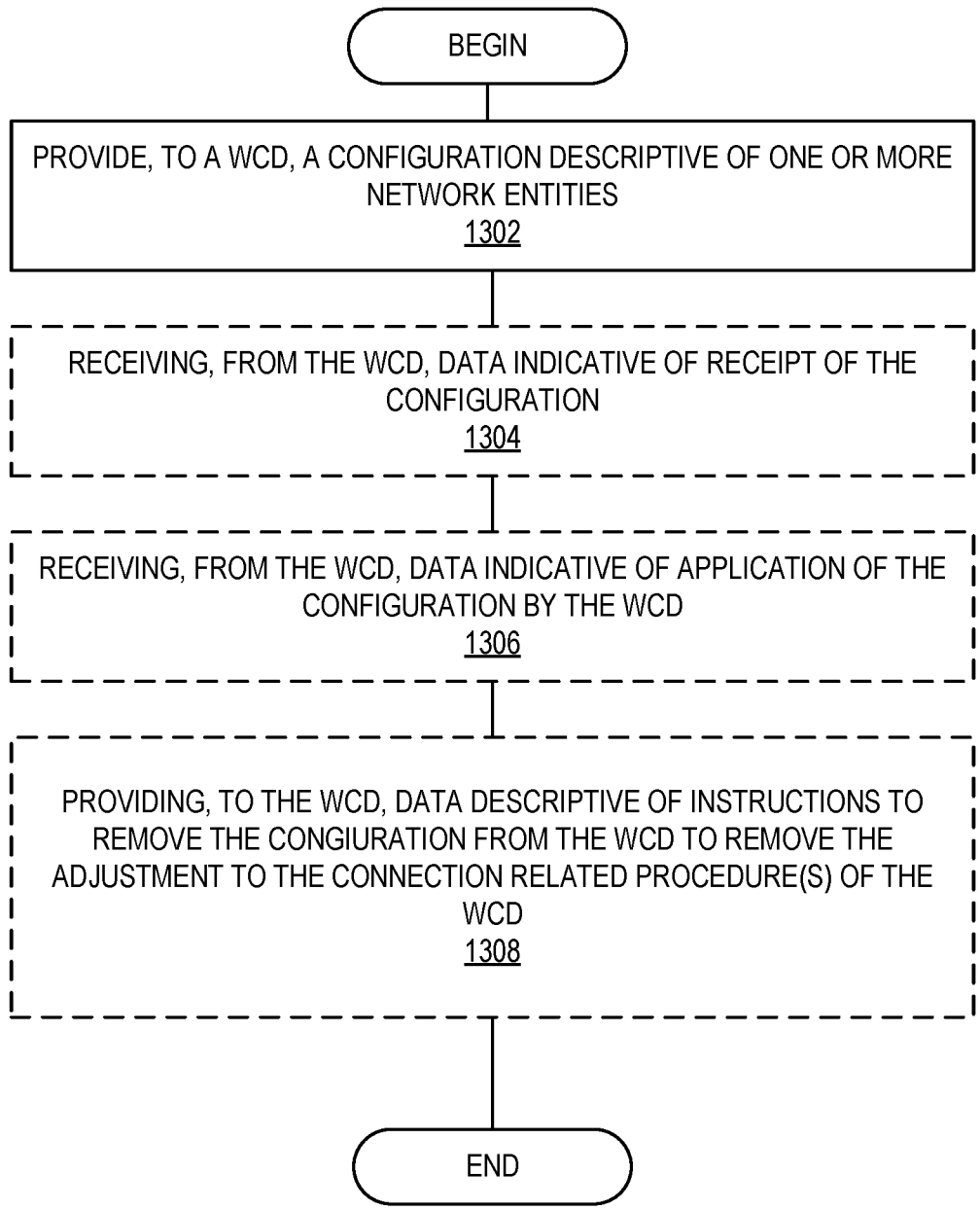
FIG. 13 is a data flow diagram for a method performed by a network node for securing wireless communication using a configuration provided to a wireless communication device according to some embodiments of the present disclosure.

FIG. 13 is a data flow diagram for a method performed by a network node for securing wireless communication using a pinning configuration provided to a WCD according to some embodiments of the present disclosure.

At step 1300, the network node provides, to a WCD, a pinning configuration descriptive of one or more network entities. The one or more network entities include one or more LNEs, one or more INEs, or both one or more LNEs and one or more INEs. The pinning configuration is configured to, responsive to the WCD making a determination that a trigger condition for applying the pinning configuration has occurred, be applied by the WCD such that one or more connection related procedures of the WCD related to connection between the WCD and at least one of the one or more network entities are adjusted in such a manner that the WCD is:
 (a) permitted to connect to only the one or more LNEs;
 (b) is not permitted to connect to the one or more INEs;
 (c) is both permitted to connection to only the one or more LNEs and not permitted to connect to the one or more INEs; or
 (d) is not permitted to connect to any network entity.

In some embodiments, one of the one or more LNEs is or otherwise includes the network node.

In some embodiments, the one or more network entities include one or more LNEs, and the one or more LNEs include one or more network cells. Additionally, or alternatively, in some embodiments, the one or more network entities include one or more INEs, and the one or more INEs include one or more network cells.

In some embodiments, the pinning configuration includes implicit information for at least one of the one or more network entities. The implicit information is descriptive of one or more of a bandwidth, a number of supported bands, a frequency range, and/or an antenna configuration.

In some embodiments, the pinning configuration includes explicit information for at least one of the one or more network entities. The explicit is descriptive a connection priority level for each of the one or more network entities.

In some embodiments, the pinning configuration comprises timing information configured such that:
 (a) the configuration cannot be applied by the WCD before a reference timer has expired;
 (b) the configuration cannot be applied by the WCD before a reference time instance has occurred;
 (c) the configuration cannot be applied by the WCD after a validity timer has expired;
 (d) the configuration cannot be applied by the WCD after a validity time instance has occurred;
 (e) after the configuration is applied by the WCD, the configuration is removed from the WCD after a timer has expired or a time instance has occurred; or
 (f) any combination of two or more of (a)-(e).

In some embodiments, the timing information is configured to initiate a timer or time instance when the WCD makes the determination that the trigger condition for applying the pinning configuration has occurred.

In some embodiments, the pinning configuration further includes geographic information indicative of a geographic area. The pinning configuration is configured such that the WCD must be within the geographic area to apply the pinning configuration to the WCD. In some embodiments, the geographic information includes:
 (a) geographic coordinates for the geographic area;
 (b) a name for the area;
 (c) a TA;
 (d) a MCC;
 (e) a MNC; or
 (f) any combination of two or more of (a)-(e).

In some embodiments, the geographic information includes neighboring cell identifiers for a neighboring cell. The pinning configuration is configured such that the WCD must be within the geographic area to apply the pinning configuration to the WCD.

In some embodiments, the pinning configuration is indicative of a period of time for which the WCD is permitted to apply the pinning configuration.

In some embodiments, when applied by the WCD, the pinning configuration is configured to disable one or more of intra-frequency reselection or inter-frequency reselection for the WCD for the period of time. Additionally, or alternatively, in some embodiments, when applied by the WCD, the pinning configuration is configured to disable cell handover for the WCD for the period of time.

In some embodiments, the pinning configuration being applied by the WCD such that the one or more connection related procedures of the WCD related to the connection between the WCD and the at least one of the one or more network entities are adjusted includes the WCD being pinned to an entity such that the WCD is prohibited from establishing a connection to a different entity. The WCD being pinned to an entity includes:
 (a) the WCD being pinned to a network cell using a PCI, a CGI, or a GCI;
 (b) the WCD being pinned to a base station using a gNB identifier;

(c) the WCD being pinned to a PLMN using a MCC and an MNC, or using a PLMN identifier;
(d) the WCD being pinned a TAC;
(e) the WCD being pinned to an AMF, using an AMF region identifier, or using an AMF set identifier;
(f) the WCD being pinned to a private network using a CAG identifier;
(g) the WCD being pinned to a frequency; or
(h) any combination of two or more of (a)-(g).

In some embodiments, providing, to the WCD, the pinning configuration descriptive of the one or more network entities includes generating the pinning configuration and storing the pinning configuration on a SIM card corresponding to the WCD. Alternatively, in some embodiments, providing, to the WCD, the pinning configuration descriptive of the one or more network entities includes providing the pinning configuration descriptive of the one or more network entities to the WCD via an application executed by the WCD.

In some embodiments, the network node is or otherwise includes a core node. Additionally, or alternatively, in some embodiments, the network node is or otherwise includes a gNB, an eNB, an AMF, or an SMF.

In some embodiments, the pinning configuration further includes assistance information, and the WCD making the determination that the trigger condition for applying the pinning configuration has occurred includes the WCD making the determination based at least in part on the assistance information. The assistance information is descriptive of:
(a) a largest signal level receivable by the WCD from an LNE;
(b) a smallest magnitude difference between signal levels receivable at the WCD from any pair of legitimate network cells with different cell identifiers;
(c) a smallest possible magnitude difference between signal levels receivable at the WCD from any pair of network cells with identical cell identifiers;
(d) a smallest possible magnitude of time difference between signals from two legitimate network cells with different cell identifiers receivable at the WCD;
(e) a smallest possible magnitude of time difference between signals from two legitimate network cells with identical cell identifiers receivable at the WCD;
(f) a smallest possible transmit power with which the WCD sends uplink signals;
(g) information descriptive of one or more patterns of certain physical signals that repeat periodically or non-periodically in legitimate network cells; or
(h) any combination of two or more of (a)-(g).

In some embodiments, the WCD making the determination that the trigger condition has occurred includes:
(a) the WCD making a determination that a signal level received at the WCD from a network cell is above a threshold value;
(b) the WCD making a determination that the magnitude of a difference between a first signal level and a second signal level from a respective first network cell and a respective second network cell is below a threshold value;
(c) the WCD transmitting an uplink signal to a network cell to obtain an estimate of the transmit power of the network cell;
(d) the WCD detecting a presence of one or more periodic or aperiodic patterns of pre-configured physical cells transmitted by the network cell; or
(e) any combination of two or more of (a)-(d).

In some embodiments, the pinning configuration being applied by the WCD such that the one or more connection related procedures of the WCD related to the connection between the WCD and the at least one of the one or more network entities are adjusted includes:
(a) prohibiting RRC re-establishment procedure for the WCD;
(b) initiating network cell reselection procedure for the WCD based at least in part on priorities assigned to a plurality of network cells by the pinning configuration;
(c) prohibiting network cell reselection procedure for the WCD;
(d) prohibiting network cell handover procedure for the WCD;
(e) prohibiting inter-frequency reselection procedure for the WCD;
(f) prohibiting intra-frequency reselection procedure for the WCD; or
(g) any combination of two or more of (a)-(f).

At step 1304, in some embodiments, the WCD receives, from the WCD, data indicative of receipt of the pinning configuration.

At step 1306, in some embodiments, the WCD receives, from the WCD, data indicative of application of the pinning configuration by the WCD.

At step 1308, in some embodiments, the WCD provides, to the WCD, data descriptive of instructions to remove the pinning configuration from the WCD to remove the adjustment to the one or more connection related procedures of the WCD.

Figure 14:
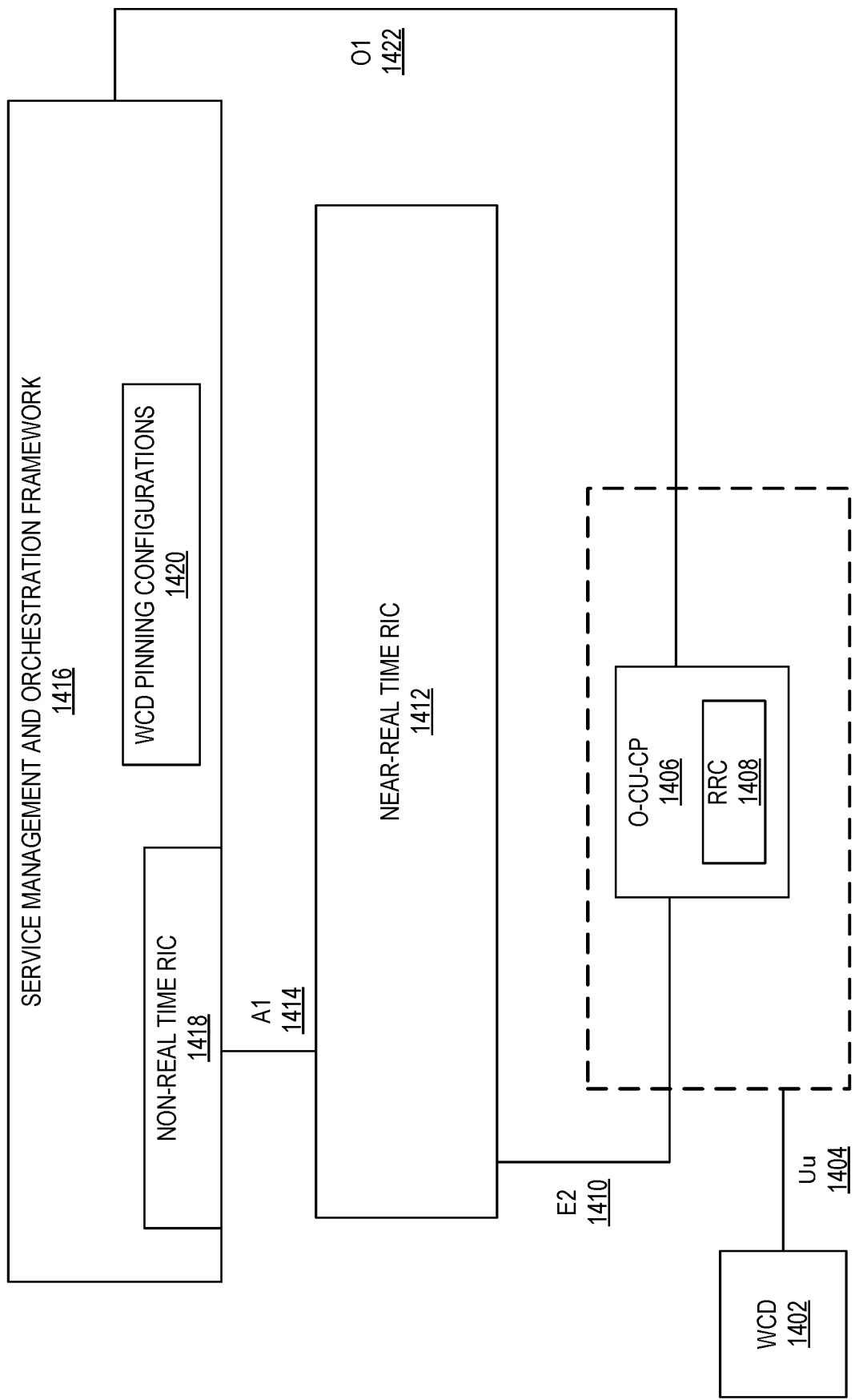
FIG. 14 is a data flow diagram for a network orchestration architecture for an Open Radio Access Network (O-RAN) for securing wireless communication.

FIG. 14 is a data flow diagram for a network orchestration architecture for an Open Radio Access Network (O-RAN) for securing wireless communication. Specifically, the WCD pinning configuration 1420 resides in the Non-Real Time RAN Intelligent Component (RIC) 1418 in the Service Management and Orchestration (SMO) Framework 1416. In this embodiment, the pinning configurations 1420 can be obtained by the O-RAN Central Unit-Control Plane (O-CU-CP) node 1406 as one method. The O-CU-CP 1406 can obtain the WCD pinning configuration 1420 directly from the Non-Real Time RIC 1418 via O1 interface 1422. Alternatively, if the pinning configurations 1420 are read by the Near-Real Time RIC 1412 via the A1 interface 1414 from the Non-Real Time RIC 1418 to be applied in different O-CU-CPs 1416, then the O-CU-CP 1416 can obtain the pinning configurations 1420 from the Near-Real Time RIC 1412 via the E2 interface 1410. The pinning configuration 1420 is then provided to the WCD 1402 via the Uu interface 1404.

Figure 15:
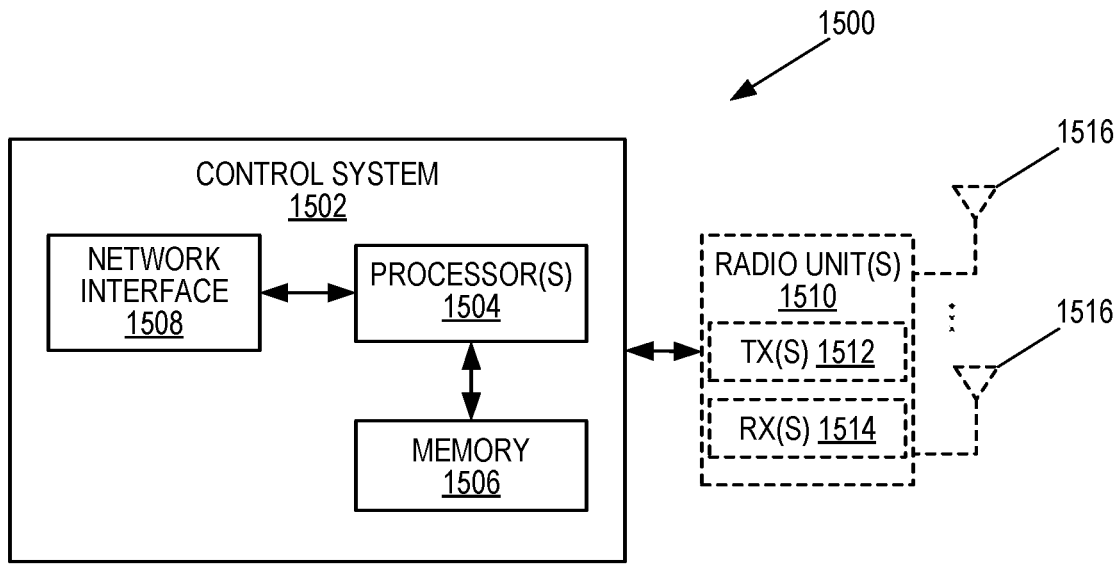
FIG. 15 is a schematic block diagram of a network node according to some embodiments of the present disclosure.

FIG. 15 is a schematic block diagram of a network node 1500 (e.g., a radio access node, etc.) according to some embodiments of the present disclosure. Optional features are represented by dashed boxes. The network node 1500 may be, for example, a base station 502 or 506 or a network node that implements all or part of the functionality of the base station 502 or gNB described herein. As illustrated, the network node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the network node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a network node 1500 as described herein. In some embodiments, the function(s) are implemented in software that is stored, e.g., in the memory 1506 and executed by the one or more processors 1504.

Figure 16:
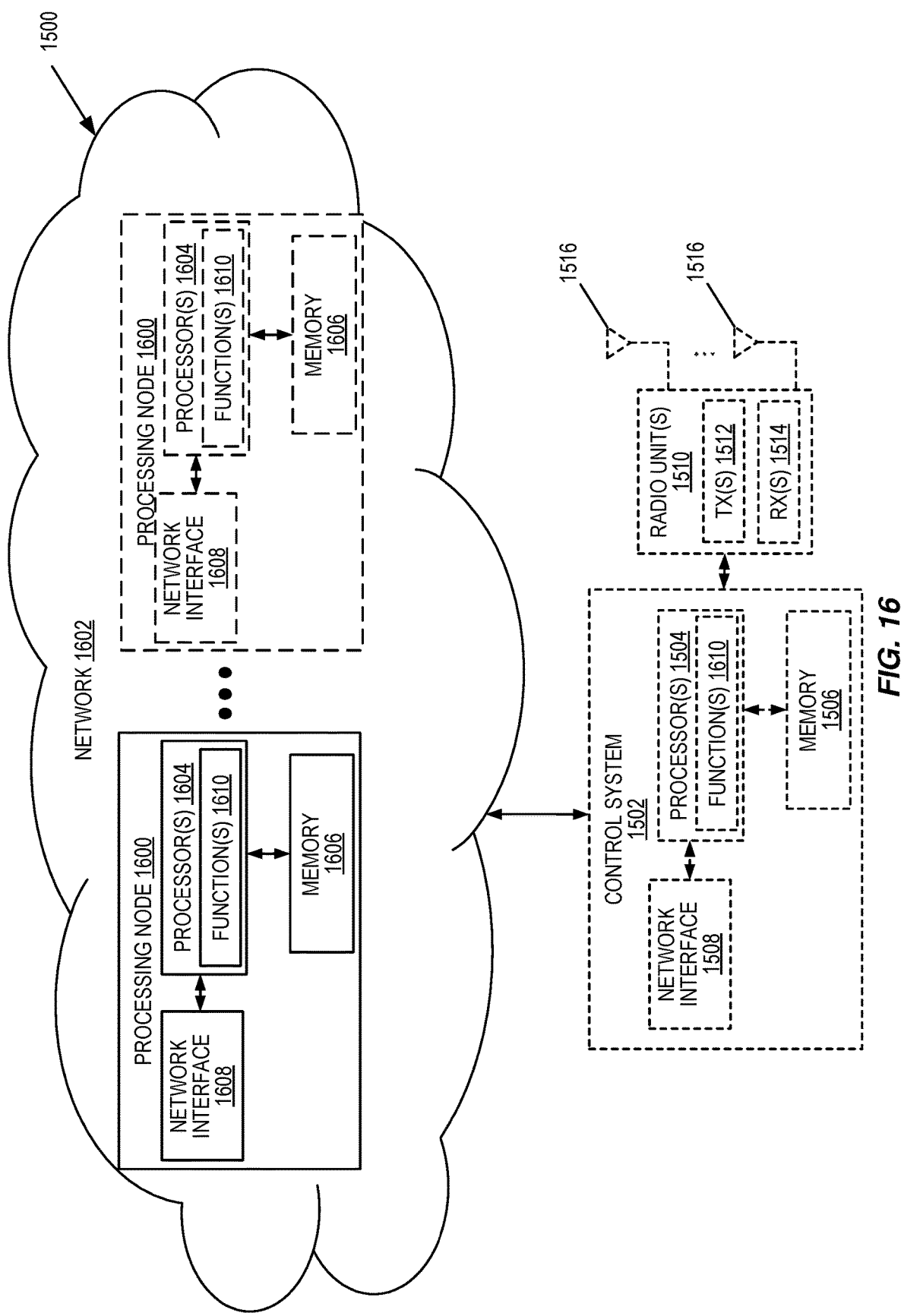
FIG. 16 is a schematic block diagram that illustrates a virtualized embodiment of the network node of FIG. 15 according to some embodiments of the present disclosure.

FIG. 16 is a schematic block diagram that illustrates a virtualized embodiment of the network node 1500 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 1500 in which at least a portion of the functionality of the network node 1500 is implemented as a virtual component(s) (e.g., via a virtual machine(s) executing on a physical processing node(s) in a network(s)). As illustrated, in this example, the network node 1500 may include the control system 1502 and/or the one or more radio units 1510, as described above. The control system 1502 may be connected to the radio unit(s) 1510 via, for example, an optical cable or the like. The network node 1500 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICs, FPGAs, and/or the like), memory 1606, and a network interface 1608.

In this example, functions 1610 of the network node 1500 described herein are implemented at the one or more processing nodes 1600 or distributed across the one or more processing nodes 1600 and the control system 1502 and/or the radio unit(s) 1510 in any desired manner. In some particular embodiments, some or all of the functions 1610 of the network node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of network node 1500 or a node (e.g., a processing node 1600) implementing one or more of the functions 1610 of the network node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
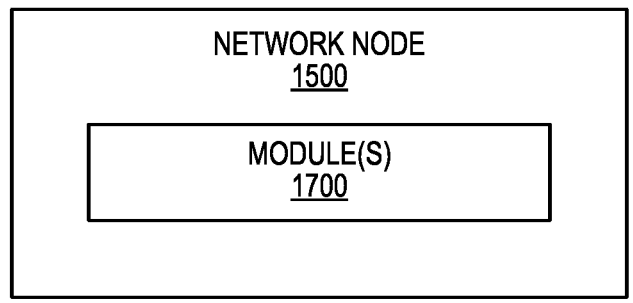
FIG. 17 is a schematic block diagram of the network node of FIG. 15 according to some other embodiments of the present disclosure.

FIG. 17 is a schematic block diagram of the network node 1500 according to some other embodiments of the present disclosure. The network node 1500 includes one or more modules 1700, each of which is implemented in software. The module(s) 1700 provide the functionality of the network node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
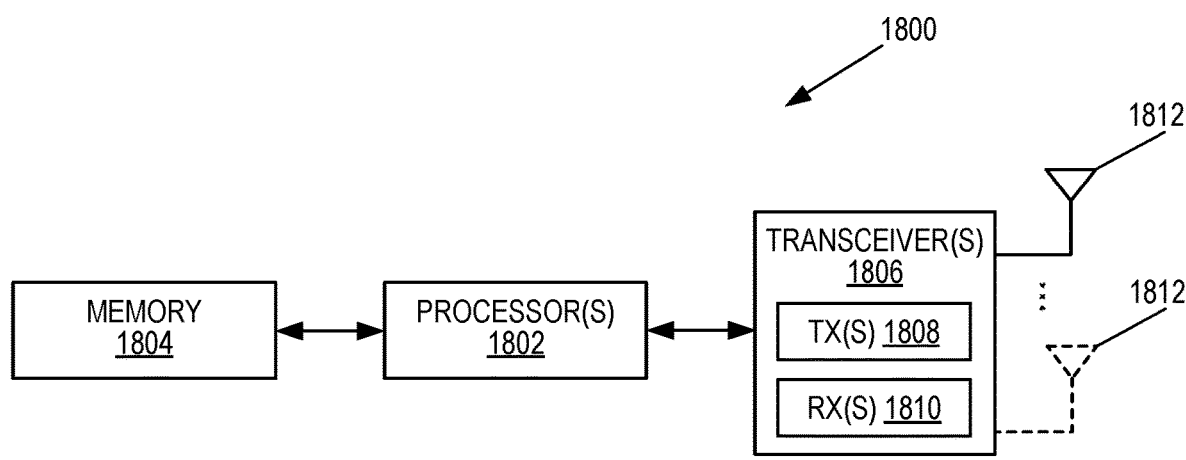
FIG. 18 is a schematic block diagram of a wireless communication device according to some embodiments of the present disclosure.

FIG. 18 is a schematic block diagram of a WCD 1800 according to some embodiments of the present disclosure. As illustrated, the WCD 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the WCD 1800 described above may be fully or partially implemented in software that is, e.g., stored in the memory 1804 and executed by the processor(s) 1802. Note that the WCD 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the WCD 1800 and/or allowing output of information from the WCD 1800), a power supply (e.g., a battery and associated power circuitry), etc.

In some embodiments, a computer program including instructions which, when executed by at least one processor, causes the at least one processor to carry out the functionality of the WCD 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
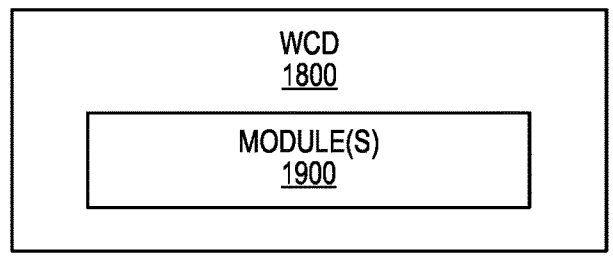
FIG. 19 is a schematic block diagram of the wireless communication device of FIG. 18 according to some other embodiments of the present disclosure.

FIG. 19 is a schematic block diagram of the wireless communication device 1800 according to some other embodiments of the present disclosure. The wireless communication device 1800 includes one or more modules 1900, each of which is implemented in software. The module(s) 1900 provide the functionality of the wireless communication device 1800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GC Fifth Generation Core
5GS Fifth Generation System
AF Application Function
AMF Access and Mobility Management Function
AN Access Network
AP Access Point
ASIC Application Specific Integrated Circuit
AUSF Authentication Server Function
BW Bandwidth
CAG Closed Access Group
CGI Cell Global Identifier
CN Core Network
CP Control Plane
CPU Central Processing Unit
C-RNTI Cell Radio Network Temporary Identifier
CU-CP Central Unit-Control Plane
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
GCI Global Cable Identifier
gNB New Radio Base Station
gNB-CU New Radio Base Station Central Unit
gNB-DU New Radio Base Station Distributed Unit
HPC Hybrid Pinning Configuration
HSS Home Subscriber Server
IMSI International Mobile Subscriber Identity
INE Illegitimate Network Entity
IoT Internet of Things
IP Internet Protocol
IPC Illegitimate Pinning Configuration
LNE Legitimate Network Entity
LPC Legitimate Pinning Configuration
LTE Long Term Evolution
MCC Mobile Country Code
MME Mobility Management Entity
MNC Mobile Network Code
MTC Machine Type Communication
NAS Non-Access Stratum
NE Network Element
NEF Network Exposure Function
NF Network Function
Ng-eNB Next Generation Enhanced or Evolved Node B
NG-RAN Next Generation Radio Access Network
NR New Radio
NRF Network Function Repository Function
NSSF Network Slice Selection Function
O-RAN Open Radio Access Network
OTT Over-the-Top
PC Personal Computer
PCF Policy Control Function
PCI Physical Cell Identifier
PDSCH Physical Downlink Shared Channel
P-GW Packet Data Network Gateway
PLMN Public Land Mobile Network
PRS Positioning Reference Signal
QoS Quality of Service
RAM Random Access Memory
RAN Radio Access Network
RIC RAN Intelligent Controller
ROM Read Only Memory
RRC Radio Resource Control
RRH Remote Radio Head
RSRP Reference Signal Received Power
RSRQ Reference Signal Received Quality
RTT Round Trip Time
SCEF Service Capability Exposure Function
SFN System Frame Number
SIM Subscriber Identification Module
SINR Signal to Interference plus Noise Ratio
SMF Session Management Function
SMO Service Management and Orchestration
SNR Signal to Noise Ratio
TA Tracking Area
TCI Transmission Configuration Indicator
TRP Transmission/Reception Point
UDM Unified Data Management
UE User Equipment
UP User Plane
UPF User Plane Function
UTC Coordinated Universal Time
WCD Wireless Communication Device Those skilled in the art will recognize improvements and modifications to the embodiments of the present disclosure. All such improvements and modifications are considered within the scope of the concepts disclosed herein.

The invention claimed is:

1. A method performed by a wireless communication device for securing wireless communication, the method comprising:
obtaining a configuration descriptive of one or more network entities comprising: (a) one or more Legitimate Network Entities, LNEs; (b) or one or more Illegitimate Network Entities, INEs; or (c) both one or more LNEs and one or more INEs;
making a determination that a trigger condition for applying the configuration has occurred; and
responsive to making the determination, applying the configuration to the wireless communication device such that one or more connection related procedures of the wireless communication device related to connection between the wireless communication device and at least one of the one or more network entities are adjusted in such a manner that the wireless communication device is:
(a) permitted to connect to only the one or more LNEs;
(b) not permitted to connect to the one or more INEs;
(c) both permitted to connect to only the one or more LNEs and not permitted to connect to the one or more INEs; or
(d) not permitted to connect to any network entity;

wherein the configuration further comprises geographic information indicative of a geographic area, wherein, the configuration is configured such that the wireless communication device must be within the geographic area for the configuration to be applied to the wireless communication device, and wherein the geographic information comprises:
(a) geographic coordinates for the geographic area;
(b) a name for the area;
(c) a list of network cell identifiers
(d) a Tracking Area, TA;
(e) a Mobile Country Code, MCC;
(f) a Mobile Network Code, MNC; or
(g) any combination of two or more of (a)-(f);
wherein the configuration is indicative of a period of time for which the configuration is to be applied to the wireless communication device; and
wherein applying the configuration to the wireless communication device such that the one or more connection related procedures of the wireless communication device related to the connection between the wireless communication device and the at least one of the one or more network entities are adjusted comprises disabling a cell change for the wireless communication device for the period of time, wherein disabling the cell change comprises:
(a) disabling one or more of intra-frequency reselection or inter-frequency reselection for the wireless communication device for the period of time;
(b) disabling cell handover for the wireless communication device for the period of time;
(c) disabling Radio Resource Control, RRC, connection re-establishment for the wireless communication device for the period of time;
(d) disabling RRC connection release with redirection for the wireless communication device for the period of time
(e) disabling serving cell change in multi-carrier operation for the wireless (e) communication device for the period of time; or
(f) any combination of two or more of (a)-(e).

2. The method of claim 1, wherein the one or more network entities comprise one or more LNEs, and wherein the one or more LNEs comprise one or more network cells.

3. The method of claim 1, wherein the one or more network entities comprise one or more INEs, and wherein the one or more INEs comprise one or more network cells.

4. The method of claim 1, wherein the configuration comprises implicit information for at least one of the one or more network entities, wherein the implicit information is descriptive of one or more of:
a bandwidth;
a frequency range;
a number of supported bands; or
an antenna configuration.

5. The method of claim 1, wherein the configuration comprises explicit information for at least one of the one or more network entities, and wherein the explicit information is descriptive a connection priority level for each of the one or more network entities.

6. The method of claim 1, wherein the configuration comprises timing information configured such that:
(a) the configuration cannot be applied before a reference timer has expired;
(b) the configuration cannot be applied before a reference time instance has occurred;
(c) the configuration cannot be applied after a validity timer has expired;
the configuration cannot be applied after a validity time instance has (d) occurred;
(e) after the configuration is applied, the configuration is removed from the wireless communication device after a timer has expired or a time instance has occurred; or
(f) any combination of two or more of (a)-(e).

7. The method of claim 6, wherein the timing information is configured to initiate a timer or time instance responsive to making the determination.

8. The method of claim 1, wherein the geographic information comprises a neighboring cell identifier for a neighboring cell, wherein the configuration is configured such that the wireless communication device must be within the geographic area for the configuration to be applied to the wireless communication device.

9. The method of claim 1, wherein:
applying the configuration to the wireless communication device such that the one or more connection related procedures of the wireless communication device are adjusted comprises pinning the wireless communication device to an entity such that the wireless communication device is prohibited from establishing a connection to a different entity; and
wherein pinning the wireless communication device to the pinned entity comprises:
(a) pinning the wireless communication device to a network cell using a Physical Cell Identifier, PCI, a Cell Global Identifier, CGI, or a Global Cable Identifier, GCI;
(b) pinning the wireless communication device to a base station using a New Radio Base Station, gNB, identifier;
(c) pinning the wireless communication device to a Public Land Mobile Network, PLMN, using a MCC and an MNC, or using a PLMN identifier;
(d) pinning the wireless communication device to a TAC;
(e) pinning the wireless communication device to an Access and Mobility Management Function, AMF, using an AMF region identifier or using an AMF set identifier;
(f) pinning the wireless communication device to a private network using a Closed Access Group, CAG, identifier;
(g) pinning the wireless communication device to a frequency; or
(h) any combination of two or more of (a)-(g).

10. The method of claim 1, wherein the wireless communication device obtains the configuration via:
a network node;
a core network node;
information stored on a Subscriber Identification Module, SIM, card; or
an application executed by the wireless communication device.

11. The method of claim 1, wherein:
the configuration further comprises assistance information;
making the determination that the trigger condition for applying the configuration has occurred comprises making the determination based at least in part on the assistance information; and
the assistance information is descriptive of:
(a) a largest signal level receivable by the wireless communication device from an LNE;

(b) a smallest magnitude difference between signal levels receivable at the wireless communication device from any pair of legitimate network cells with different cell identifiers;
(c) a smallest possible magnitude difference between signal levels receivable at the wireless communication device from any pair of network cells with identical cell identifiers;
(d) a smallest possible magnitude of time difference between signals from two legitimate network cells with different cell identifiers receivable at the wireless communication device;
(e) a smallest possible magnitude of time difference between signals from two legitimate network cells with identical cell identifiers receivable at the wireless communication device;
(f) a smallest possible transmit power with which the wireless communication device sends uplink signals;
(g) information descriptive of one or more patterns of certain physical signals that repeat periodically or non-periodically in legitimate network cells; or
(h) any combination of two or more of (a)-(g).

12. The method of claim 1, wherein making the determination that the trigger condition has occurred comprises:
(a) determining that a signal level received at the wireless communication device from a network cell is above a threshold value;
(b) determining that the magnitude of a difference between a first signal level and a second signal level from a respective first network cell and a respective second network cell is below a threshold value;
(c) transmitting an uplink signal to a network cell to obtain an estimate of the transmit power of the network cell;
(d) detecting a presence of one or more periodic or aperiodic patterns of pre-configured physical cells transmitted by the network cell;
(e) receiving a message indicative of the occurrence of the trigger condition; or
(f) any combination of two or more of (a)-(e).

13. The method of claim 1, wherein applying the configuration to the wireless communication device such that the one or more connection related procedures of the wireless communication device are adjusted comprises:
(a) prohibiting Radio Resource Control, RRC, re-establishment procedure;
(b) initiating network cell reselection procedure based at least in part on priorities assigned to a plurality of network cells by the configuration;
(c) prohibiting network cell reselection procedure;
(d) prohibiting network cell handover procedure;
(e) prohibiting inter-frequency reselection procedure;
(f) prohibiting intra-frequency reselection procedure; or
(g) any combination of two or more of (a)-(f).

14. The method of claim 1, wherein the method further comprises providing, to the network node, data indicative of application of the configuration to the wireless communication device.

15. The method of claim 1, wherein obtaining the configuration further comprises providing, to the network node, data indicative of receipt of the configuration.

16. The method of claim 1, wherein the method further comprises, responsive to an occurrence of a second trigger condition, removing the configuration from the wireless communication device to remove the adjustment to the one or more connection related procedures of the wireless communication device.

17. The method of claim 16, wherein the second trigger condition comprises:
expiration of a timer for application of the configuration;
occurrence of a time instance for expiration of the configuration; or
obtainment of data indicative of instructions to remove the configuration.

18. The method of claim 1, wherein the wireless communication device connecting to a network entity comprises:
(a) exchanging messages with the network entity; or
(b) adjusting cell selection behavior with the network entity.

19. A wireless communication device for securing wireless communication, wherein the wireless communication device comprises:
one or more transmitters;
one or more receivers; and
processing circuitry configured to cause the wireless communication device to perform operations comprising:
obtaining a configuration descriptive of one or more network entities comprising: (a) one or more Legitimate Network Entities, LNEs; (b) or one or more Illegitimate Network Entities, INEs; or (c) both one or more LNEs and one or more INEs;
making a determination that a trigger condition for applying the configuration has occurred; and
responsive to making the determination, applying the configuration to the wireless communication device such that one or more connection related procedures of the wireless communication device related to connection between the wireless communication device and at least one of the one or more network entities are adjusted in such a manner that the wireless communication device is:
(a) permitted to connect to only the one or more LNEs;
(b) not permitted to connect to the one or more INEs;
(c) both permitted to connection to only the one or more LNEs and not permitted to connect to the one or more INEs; or
(d) not permitted to connect to any network entity;
wherein the configuration further comprises geographic information indicative of a geographic area, wherein, the configuration is configured such that the wireless communication device must be within the geographic area for the configuration to be applied to the wireless communication device, and wherein the geographic information comprises:
(a) geographic coordinates for the geographic area;
(b) a name for the area;
(c) a list of network cell identifiers
(d) a Tracking Area, TA;
(e) a Mobile Country Code, MCC;
(f) a Mobile Network Code, MNC; or
(g) any combination of two or more of (a)-(f);
wherein the configuration is indicative of a period of time for which the configuration is to be applied to the wireless communication device; and
wherein applying the configuration to the wireless communication device such that the one or more connection related procedures of the wireless communication device related to the connection between the wireless communication device and the at least one of the one or more network entities are adjusted comprises disabling a cell change for the wireless communication device for the period of time, wherein disabling the cell change comprises:

(a) disabling one or more of intra-frequency reselection or inter-frequency reselection for the wireless communication device for the period of time;
(b) disabling cell handover for the wireless communication device for the period of time;
(c) disabling Radio Resource Control, RRC, connection re-establishment for the wireless communication device for the period of time;
(d) disabling RRC connection release with redirection for the wireless communication device for the period of time;
(e) disabling serving cell change in multi-carrier operation for the wireless communication device for the period of time; or
(f) any combination of two or more of (a)-(e).

* * * * *